(12) United States Patent
Parikh

(10) Patent No.: US 12,385,847 B2
(45) Date of Patent: Aug. 12, 2025

(54) GEMSTONE ANALYSIS DEVICE, SYSTEM, AND METHOD USING NEURAL NETWORKS

(71) Applicant: Parikh Holdings LLC, Scarsdale, NY (US)

(72) Inventor: Aniket Parikh, Scarsdale, NY (US)

(73) Assignee: Parikh Holdings LLC, Scarsdale, NY (US)

( * ) Notice: Subject to any disclaimer, the term of this patent is extended or adjusted under 35 U.S.C. 154(b) by 89 days.

(21) Appl. No.: 18/322,934

(22) Filed: May 24, 2023

(65) Prior Publication Data

US 2024/0393255 A1   Nov. 28, 2024

(51) Int. Cl.
*G01N 21/87* (2006.01)
*G01N 21/88* (2006.01)

(52) U.S. Cl.
CPC .......... *G01N 21/87* (2013.01); *G01N 21/8851* (2013.01); *G01N 2021/8854* (2013.01); *G01N 2021/8887* (2013.01)

(58) Field of Classification Search
CPC ............... G01N 21/87; G01N 21/8851; G01N 2021/8854; G01N 2021/8887
See application file for complete search history.

(56) References Cited

U.S. PATENT DOCUMENTS

| | | | |
|---|---|---|---|
| 2019/0043243 A1* | 2/2019 | Chui | G06V 10/776 |
| 2020/0364846 A1* | 11/2020 | Tong | G06V 10/44 |
| 2021/0201461 A1* | 7/2021 | Parikh | G06T 7/0002 |

OTHER PUBLICATIONS

International Search Report and Written Opinion for International Patent Application No. PCT/US24/30821, mailed on Sep. 3, 2024. 16 pages.

* cited by examiner

*Primary Examiner* — Jamil Ahmed
(74) *Attorney, Agent, or Firm* — LEASON ELLIS LLP

(57) ABSTRACT

A method, system, and device evaluate a gemstone using a gemstone imaging and evaluation device. The method includes capturing a plurality of training images of a plurality of gemstones using an image capturing device having a plurality of different focal settings, training a machine learning module using the plurality of training images, capturing a query image of a gemstone, analyzing the query image using the trained machine learning module, identifying a selected feature of the gemstone within the query image, and outputting a notification of the identified selected feature. The system and the gemstone imaging and evaluation device implement the method.

19 Claims, 17 Drawing Sheets
(10 of 17 Drawing Sheet(s) Filed in Color)

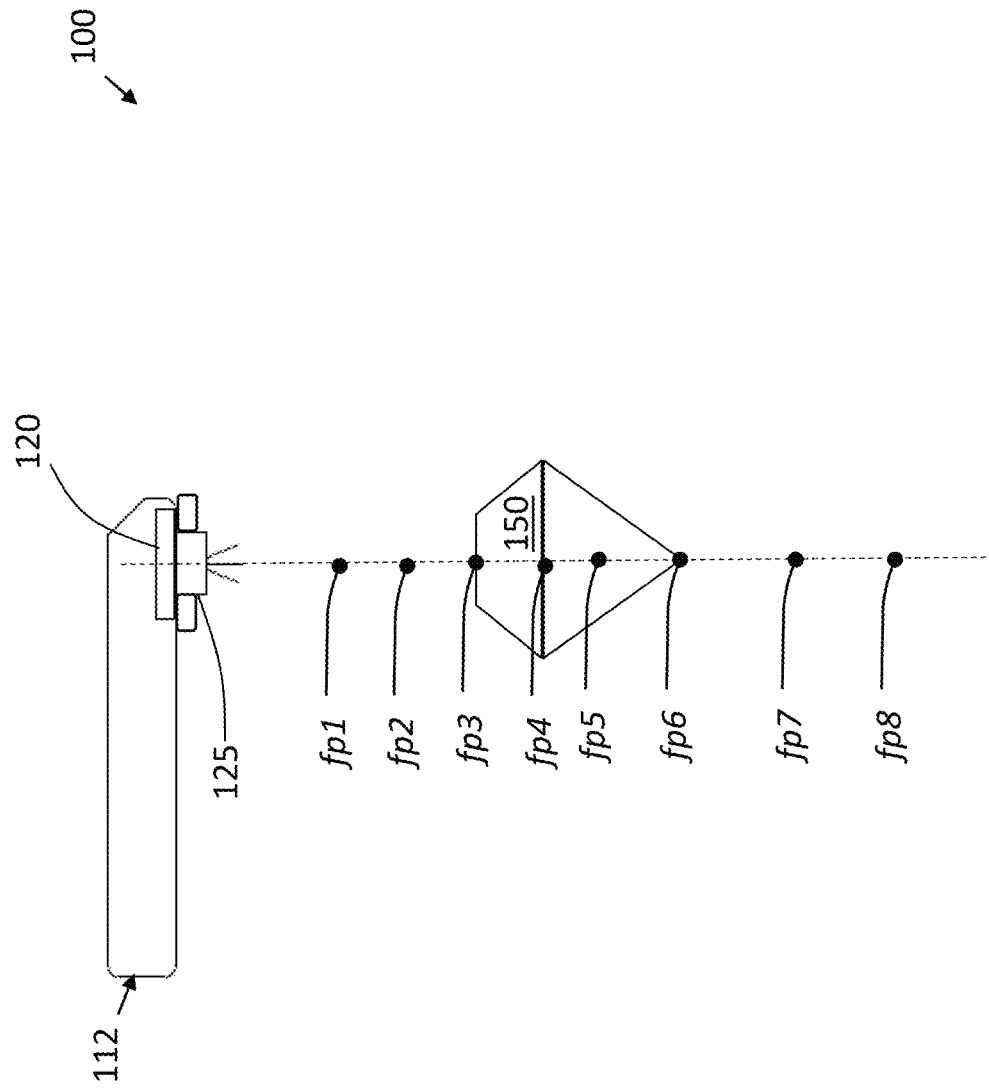

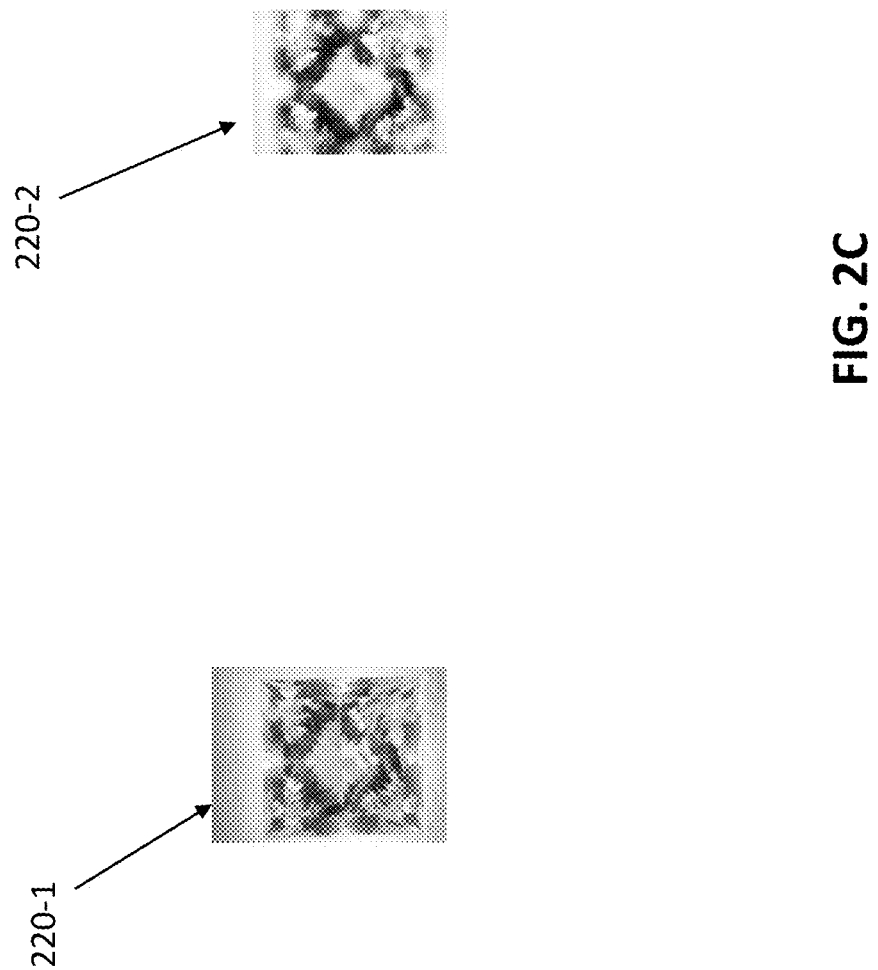

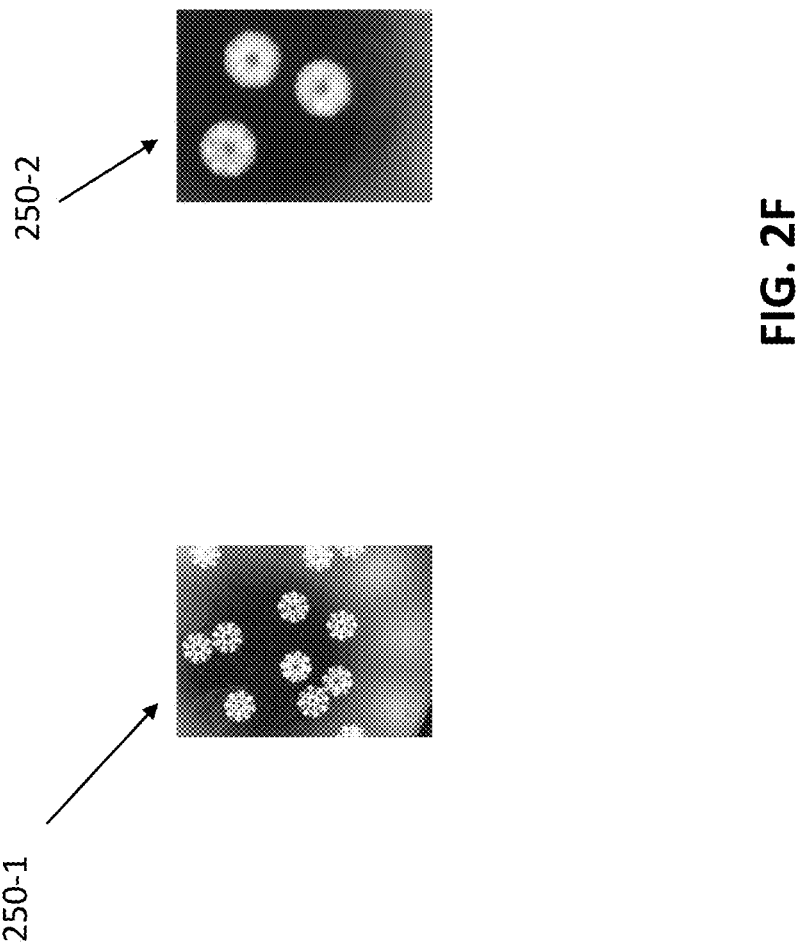

GEMSTONE ANALYSIS DEVICE, SYSTEM, AND METHOD USING NEURAL NETWORKS

FIELD OF THE DISCLOSURE

The present disclosure relates generally to imaging and analyzing gemstones, and more particularly to a device, a system, and a method for imaging a gemstone and analyzing the gemstone images using neural networks to detect gemstone characteristics.

BACKGROUND OF THE DISCLOSURE

The evaluation of gemstones is a subjective process, prone to suffer the biases of the human evaluator visually viewing a gemstone. Many gemological laboratories have tried to define the four main characteristics of gemstones: cut, color, clarity, and carat, also referred to as the 4Cs. Various other properties that are considered to constitute the ideal gemstone, such as a diamond, can include: polish, symmetry, light performance, scintillation, fire, brilliance, faceting quality, weight, and various other optical, qualitative, and quantitative gradings of gemstones. This is usually done either through visual verification, but has also been performed more recently with the help of machines, expensive instrumentation, and predictive mathematical modeling. Yet, the results have always been of a subjective nature, and the methods and techniques used to obtain objectively presentable grades and results has eluded gemstone evaluators.

An example of the inability of gemstone grading laboratories to obtain objective evaluation of a gemstone is, for example, the task to clearly define what proportions of a diamond truly constitute what is an ideal or excellent cut grade. Each gemstone grading laboratory has its own criteria, such as varying ranges of proportions, symmetry, and other measurements to describe and allow a gemstone to be categorized as Ideal, Excellent, Very Good, or some other category. Accordingly, this is just a subjective explanation of the beauty of a gemstone. Gemstone grading laboratories have not been able to do such categorization for a gemstone or jewelry with a fancy or non-round shape, such as a marquise-type or a princess-type gemstone. Fancy shapes only receive symmetry and polish as descriptor tags for their cut grade. The permutations and combinations of the main parts of a gem, including the table, the crown, the pavilion and the culet, as well as the faceting shapes, angles, placements, reflective index, and proportions present an enormous task for gemstone grading laboratories. The laboratories have tried to solve the subjectivity problem by either asking human testers, mathematical models, or machines to arrive at an objective gemstone grading solution. However, such objective results have been elusive. Another characteristic, usually used to describe diamonds, is the luster of a gemstone. However, this characteristic is also elusive and subjective to define, as well as being difficult to gauge even by machines.

Natural diamonds and gemstones are many times over more precious than man-made diamonds and lab-created gems. Typically, it has been nearly impossible for even a trained professional or a gemstone grading laboratory to visually distinguish between a natural diamond and a lab-created diamond made by a carbon vapor deposition (CVD) process, or by a high pressure high temperature (HPHT) process and the like. High-end machines and techniques are required to differentiate the natural diamonds from lab-created diamonds. However, as newer technologies are implemented in the creation of lab-grown diamonds and other gemstones, even high-end machines and processes fail at times to differentiate the natural diamonds from lab-created diamonds. Gemstone grading laboratories must then play catch up with new and evolving technologies, opening the possibilities for fraud, or for simple and genuine mistakes such as the intermingling or misrepresentation of lab-made gems as natural gemstones. Such fraud and mistakes can cause great monetary and reputational harm. Additionally, for a lay person, to even visually distinguish a cubic zirconia (CZ) from a diamond is difficult.

Checking if gemstones, set in jewelry or otherwise, have been switched fraudulently or replaced, either with a similar or another inferior gemstone, a simulant, or a synthetic, or has been recut, broken, chipped, etc., is difficult using known techniques. Current identification processes require expensive or intrusive techniques such as laser inscribing on the girdle, or applying microscopic lasers or inserting genetic markers or biomarkers into the gemstone as bio-tracers. However, such identification processes are difficult to recheck easily without high-tech instruments, trained professionals, or technical know-how.

A method to count gemstones in an easy manner specially for when the image is not perfectly in focus, or the lighting conditions are not optimal while set in jewelry or loose was also needed.

Accordingly, a more cost-effective, more useable and accurate method for gemstone analysis is needed. It is in regard to these and other problems in the art that the present disclosure is directed to provide a technical solution for imaging gemstones and an associated evaluation technique that overcomes the problems inherent in previous gemstone evaluation systems and methods.

SUMMARY OF THE DISCLOSURE

According to an aspect of the disclosure, a method for evaluating a gemstone from a gemstone image is provided. The method comprises the step of receiving, by a computing device, training image sets for a plurality of gemstones. The computing device has a non-transitory computer-readable storage medium and a processor configured by executing a software program stored in the storage medium. The training image sets are captured using an image capturing device. The image capturing device can include one or more macro lenses. The image capturing device can include a lighting system. Each training image set comprises a plurality of images of a respective one of the plurality of gemstones captured at different focal settings. The method also includes the step of training, with the processor, a machine learning algorithm using the plurality of training image sets. In particular, the machine learning algorithm is trained to detect at least one gemstone feature from one or more images of a gemstone.

The method also includes the steps of receiving, at a processor, a query image of a gemstone and analyzing the query image using the trained machine learning algorithm. Furthermore, the trained machine learning algorithm performs the step of identifying, based on the query image of the gemstone, one or more of the at least one gemstone feature. Additionally, the method includes the step of outputting a notification of the identified one or more of the gemstone features. The method can further included the step of performing tasks on the results of the identifying of the at least one gemstone feature. For example, the method can include subjective grading and analysis of the at least one gemstone feature. The method can also include objective grading and analysis of the at least one gemstone feature. The method can further include deductive grading and analysis of the at least one gemstone feature. In addition, the method can include valuation of the gemstone based on the at least one gemstone feature. Also, the method can include other user objectives based on the at least one gemstone feature. Alternatively, the method can include other predetermined objectives based on the at least one gemstone feature. For example, the method can carry out predetermined objectives and tasks.

According to a further aspect, a system for evaluating a gemstone from a gemstone image is disclosed. The system comprises an image capturing device having a plurality of different focal configurations to capture a query image of the gemstone and a gemstone evaluation device. The image capturing device can be a fixed device having known settings, such as predetermined focal settings. Alternatively, the image capturing device can be a mobile device, such as a handheld device. A user can move the mobile device to vary the focal point of the mobile device. Alternatively, the user can fix a setting of the mobile device and then move the mobile device in different directions such as up and down, while the focus is fixed. With such a single fixed focus, images can be taken at the fixed focus. The gemstone evaluation device includes a processing unit comprising a machine learning algorithm. In particular, the machine learning algorithm is trained using training image sets for a plurality of gemstones. Each training image set includes a plurality of images of a respective one of the plurality of gemstones captured at different focal settings and using different imaging and lighting conditions. As a result, the machine learning algorithm is trained to detect at least one gemstone feature from one or more gemstone images.

Furthermore, the processing unit is configured to receive the query image of the gemstone from the image capturing device, and analyze the query image using the trained machine learning algorithm. Specifically, the trained machine learning algorithm is configured to identify, based on the query image, one or more features of the gemstone from among the at least one gemstone feature. The system also includes an output device configured to output a notification of the identified one or more features of the gemstone.

Any combinations of the various embodiments and implementations disclosed herein can be used. These and other aspects and features can be appreciated from the following description of certain embodiments of the invention and the accompanying drawings and claims.

BRIEF DESCRIPTION OF THE DRAWINGS

The application file contains at least one drawing executed in color. Copies of this patent application publication with color drawings will be provided by the Office upon request and payment of the necessary fee.

FIG. 2A is an enlarged side elevation view of the system of FIG. 1A illustrating focusing of a gemstone. 210-1

FIG. 2C is a set of images of a gemstone captured by the gemstone imaging and evaluation device at different focal points.

FIG. 2F is a set of images of a gemstone disposed in a box with a window as captured by the gemstone imaging and evaluation device.

Figure 1A:
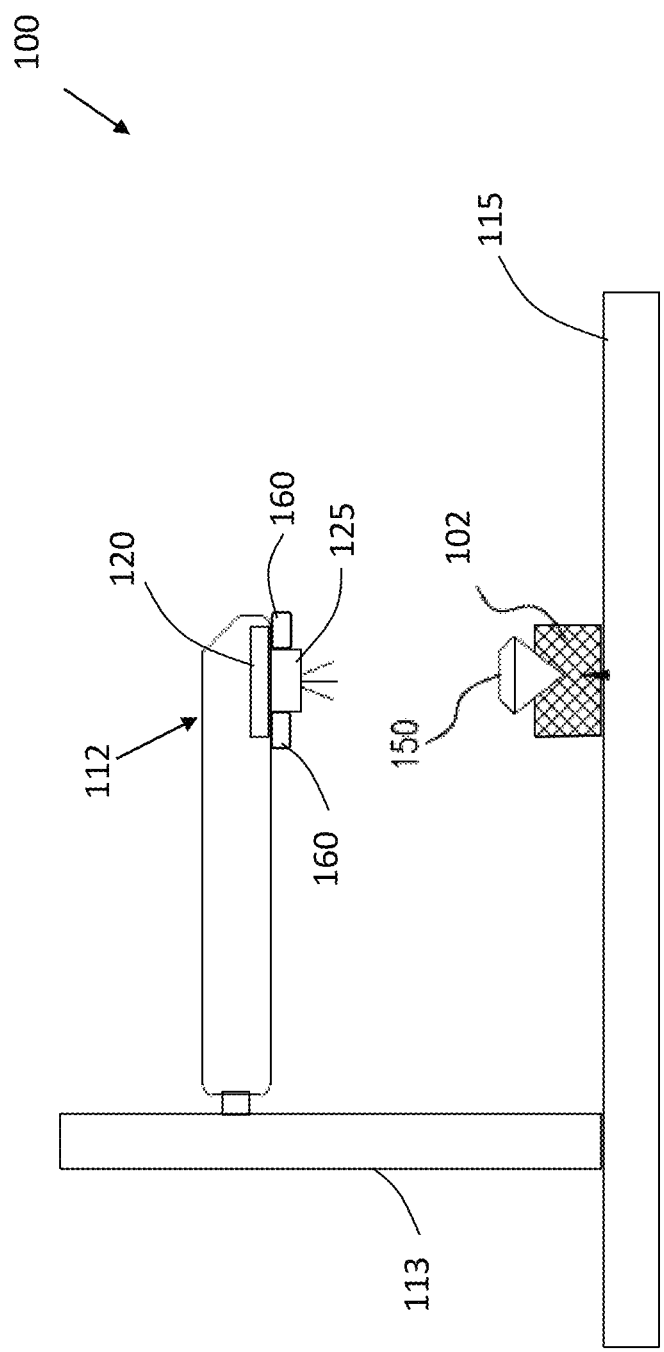
FIG. 1A is a side elevation view of a system including a gemstone imaging and evaluation device, according to an embodiment.

It is noted that the drawings are illustrative and not necessarily to scale.

DETAILED DESCRIPTION OF CERTAIN EMBODIMENTS OF THE DISCLOSURE

Example embodiments of the present disclosure are directed to a gemstone analysis system and method for imaging a gemstone and analyzing the gemstone images using neural network-based image processing algorithms. The system comprises a gemstone imaging and evaluation device that includes a camera and a processing computer. In some embodiments, one or more images of a gemstone are captured and analyzed so that the physical and optical characteristics of the gemstone can be identified and the quality of the gemstone can be evaluated based on objective and deductive features. In some cases, the system can be used for gemstones that can be part of a jewelry item, such as a ring or a necklace. The system can also be used for analyzing one or more loose gemstones, or a gemstone set in a gem holder.

Existing gemstone analysis systems and methodologies seek to identify gemstone features from one or more images focused on portions of a gemstone located on or within the gemstone. However, taking precisely focused images of a gemstone can be difficult without the aid of expensive dedicated gemstone imaging systems operating in a controlled environment. Capturing precisely focused images of a gemstone is particularly challenging when using conventional camera devices, such as the digital cameras found on mobile devices or smartphones. Variations in lighting conditions, human errors, or shaky hands can result in blurry, fuzzy, and out-of-focus images that are not conducive to the extraction and processing of gemstone feature information when using conventional image-based gemstone analysis techniques. Thus, conventional image-based gemstone analysis techniques can produce false or incorrect results.

According to a salient aspect, embodiments of the gemstone evaluation system and method disclosed herein are specifically configured to leverage even blurry defocused images (e.g., as a result of the images being overfocused or underfocused) to extract feature data and produce objective evaluations of a gemstone. Specifically, the gemstone evaluation system and method provide a solution that captures a set of images of a gemstone at a range of focal settings, including focused, overfocused and underfocused images, and processes the set of images using one or more neural network-based algorithms trained to detect gemstone characteristics that are useable to quantify a variety of measures of gemstone quality. In some instances, image can be taken up to a point at which a gemstone aura, halo, or any other lighting or patterns of the gemstone coming out of the image is minimized or even reduced to zero. For example, using auto exposure (AE) or auto focus (AF) as a setting of the camera, an image can be taken. At one point, the settings of the camera can cause all of the halos, lights, and colors to vanish, creating a "black" image. When such a "black" image is attained, the corresponding settings of the camera can be used as a "stop" setting. The "stop" setting can also be used, for example, as a distance measuring tool as well, which determines how far the camera is moved from one point to the point of attaining the "stop" setting. Such a process can measure a distance traveled and thus can gauge how far the light travels. The gauging of the distance traveled can also measure brightness and other features of a gem.

FIG. 1A is a side elevation view of an example gemstone evaluation system 100 for imaging and analyzing a gemstone 150, according to an embodiment. The system 100 includes an image capturing and gem evaluation device 112 for imaging and evaluating the gemstone 150. The image capturing and gem evaluation device 112 includes an image capturing component 120 with a lens 125. The lens 125 can include any known lens configuration or type of optics. The image capturing and gem evaluation device 112 can be retained on a mount 113 extending vertically from a base 115. The mount 113 can orient the device 112 in any angle. In addition, the mount 113 can position the device 112 in any position. The device 113 can be a handheld device, and the mount 113 can releasably retain the handheld device 113. In some embodiments, the system 100 includes a gemstone holder 102, positioned on the base 115, and configured to hold the gemstone 150 during imaging. One or more light sources 160 can be configured to illuminate the gemstone 150 during imaging. For instance, in an embodiment, the light sources 160 can define a ring of light sources arranged about the lens 125.

Figure 1B:
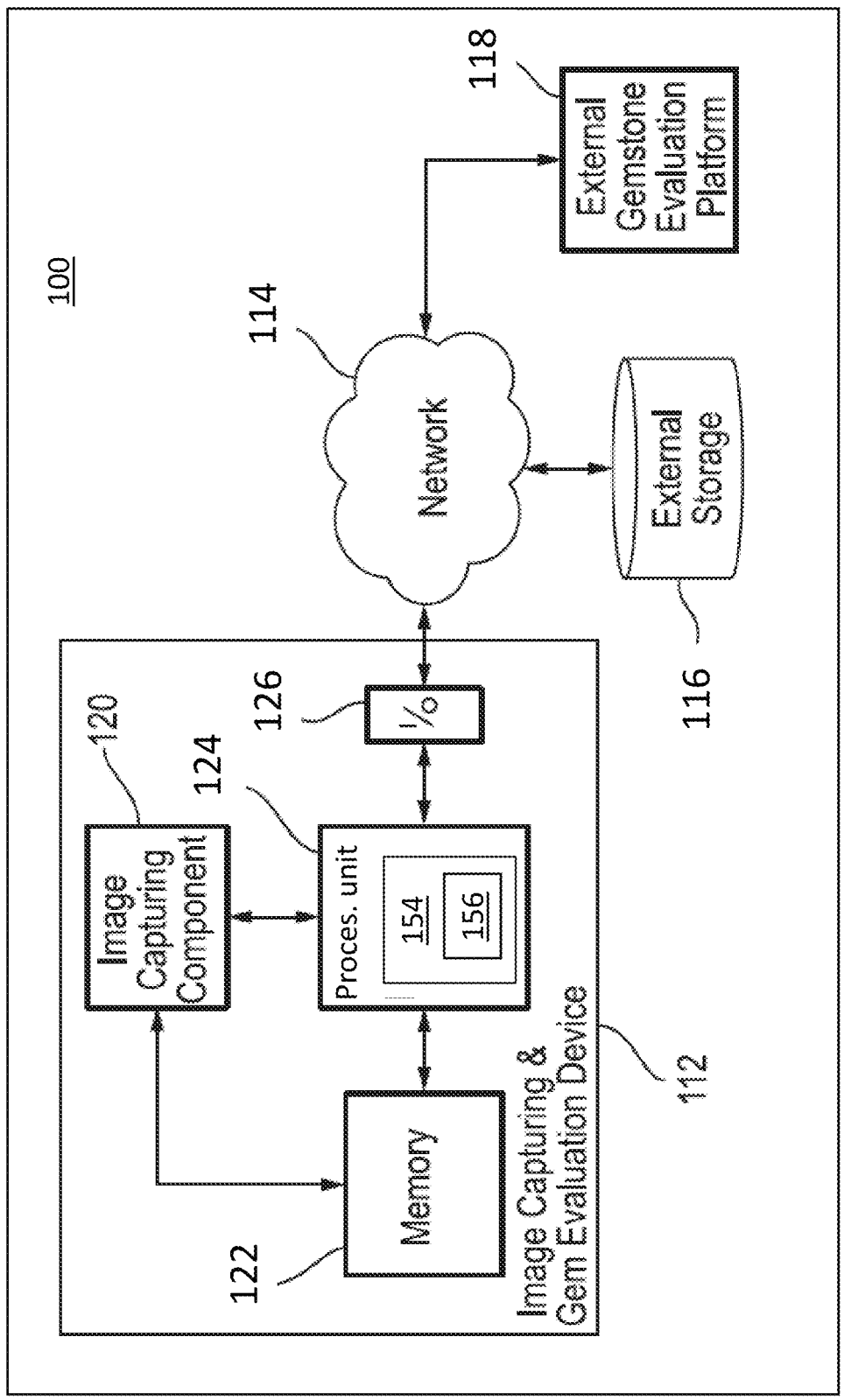
FIG. 1B is a schematic of the system of FIG. 1A.

FIG. 1B is a schematic diagram of the exemplary image capturing and gem evaluation device 112 of the system 100. As shown, a network 114, external storage 116, and a gemstone evaluation platform 118 can be in communication with the image capturing and gem evaluation device 112. The image capturing and gem evaluation device 112 includes an image capturing component 120, a memory 122, a processing unit 124, and an input/output (I/O) device 126. The processing unit 124 can be any known type of processing device, such as a processor, a microcontroller, or a microprocessor.

The image capturing and gem evaluation device 112 can be any known device including the image capturing component 120, and can be configured to capture and process one or more images of the gemstones as described herein. The image capturing component 120 can be embodied as a camera. In some embodiments, the image capturing and gem evaluation device 112 is a mobile phone, such as a smart phone, with the image capturing component 120 comprising the mobile phone camera. In an embodiment, the lens 125 of the image capturing component 120 can comprise the lens on-board the mobile phone camera, however, in addition or alternatively, it can comprise a macro lens, which can improve image quality. In an example configuration, the macro lens can be a wide-angle lens or a 35 mm lens.

The memory 122 can be or can include a program memory, a read-only memory (ROM), a random-access memory (RAM), or a cloud-based storage environment. The memory 122 can store image data received from the image capturing component 120 for processing by the processing unit 124. The processing unit 124 can access data in the memory to be processed. For example, with the data stored in a cloud-based memory 122, the processing unit 124 can process the data using cloud-based processing. The memory 122 and the processing unit 124 can be configured in a mobile device. The processing unit 124 processes the image data as described herein to evaluate the gemstone 150 or to facilitate further processing, via the I/O device 126, by the network 114 using the external storage 116 and the external gemstone evaluation platform 118. The I/O device 126 can include a transceiver, a network communication interface, or any known communication device. The I/O device 126 can be a transceiver or a network communication device configured to transmit information corresponding to the evaluation of a gemstone. Accordingly, it should be understood that the gemstone evaluation methods described as being performed by the processing unit 124 can similarly be implemented, either in whole or in part, by the gemstone evaluation platform 118 or other computing device that is communicatively coupled to the processing unit 124. In addition, the I/O device 126 can be a user interface and/or a display configured to output to a user the notification or other such information corresponding to the evaluation of the test gemstone 150. For instance, the display can be a touchscreen configured to receive user inputs and to display outputted notifications and information to the user. The display can also display a graphic user interface (GUI) configured to allow a user to interactively control the system 100, such as to manually initiate imaging and evaluation of the test gemstone 150, and to view the displayed notifications and information. Such a GUI can allow the user to add, input, change, manipulate, or otherwise control data used by the device 112.

As an example, the notification output by the device 112 can provide a location and type of various gemstone features on an actual query image of the gemstone 150. Features identified in the notification can include, for example, an inclusion, a particle on the gemstone, a polishing mark, a scratch, an internal pattern, an external pattern, a color of the gemstone, a clarity, a cut, a symmetry, faceting, an edge, a shape of the gemstone, and a color variation of the test gemstone among others. For example, an external pattern can be created by a mirage, by a ghost image, or by a hologram. In addition, other features of the test gemstone which are identified in the notification can include a light performance, formed light patterns, created light patterns, and other known features of a gemstone. The feature location outputted in the notification can be represented by a bounding box shown on the query image, by data points including coordinates of the feature, or by a representation of the image such as a vector. Other representations of the image can include an emoji or other symbols or characters. For example, using a bounding box, a segmentation of the feature can be shown on the query image. the query image can also be colored to represent a feature in the query image. In addition, the notification of the location or type of feature can be transposed onto an image, such as a photograph or printout of the test gemstone 150, a line diagram, or in any other such visual representation. Furthermore, the notification can include a numerical probability that a particular type of feature is present at the location in the test gemstone 150.

The network 114 can be any known network such as the Internet, a cellular network, or any other type of network, such as a local area network (LAN), a metropolitan area network (MAN), a wide area network (WAN), a mobile network, or a wired or wireless network. The external gemstone evaluation platform 118 can be any known platform operated or otherwise controlled by an entity such as a gemstone dealer, a user that grades gemstones, or a gemstone evaluating entity such as a laboratory that evaluates gemstones to determine gradings and pricings used in sales of gemstones. The external storage 116 can be any known database or other known storage component operated or otherwise accessible by such an entity.

According to a salient aspect, the image capturing and gem evaluation device 112 can be configured to capture a plurality of images of a gemstone with the objective lens 125 of the image capturing component 120 set to a plurality of different focal settings relative to the gemstone 150, respectively. More specifically, the image capturing component 120 can, under the control of the processing unit 124, be configured to capture images of the gemstone while in-focus on a portion of a gemstone 150 located on or within the gemstone 150, or while overfocused and/or while underfocused relative to the gemstone 150. For instance, FIG. 2A is a side-view illustrating the position of the gem evaluation device relative to a gemstone 150 and respective focal points (fp1, fp2 . . . fp8) of a plurality of captured images. In one example, fp1-fp2 are out of focus, fp3 is in-focus on the top of the gemstone 150, fp4-fp6 are overfocused, and fp7-fp8 are underfocused, that is, focused beyond the gemstone 150. It is to be understood that, although fp4-fp6 are overfocused, different parts of the gemstone 150 can be in-focus. In addition, changing the focal settings of image capturing component 120 or changing the distance between the image capturing component 120 and the gemstone 150 can vary the focal settings f1-f8 to be in-focus, overfocused, underfocused, or out of focus. By way of further example, as shown in FIG. 2A, an image can be captured with the image capturing component 120 held stationary above the gemstone 150 and focused on the top-most portion of an upright gemstone 150, such as its table (e.g., focal point fp3) Alternatively, in another example, the image can be captured from a side angle. In a further alternative embodiment, the image can be taken using a 360 degree view around the gemstone. Another image can be captured with the image capturing component 120 focused on the bottom-most portion of the gemstone 150 such as its culet (e.g., focal point fp6). Additional images can be captured with the image capturing component 120 focused to particular depths within the gemstone 150 between its top and bottom ends (e.g., focal points fp3, fp4, fp5). Furthermore, one or more images of the gemstone can be captured while the image capturing component 120 is overfocused (e.g., focal points fp3-fp6), and one or more images captured while the image capturing component 120 is underfocused (e.g., focal points fp7, fp8).

Figure 2B:
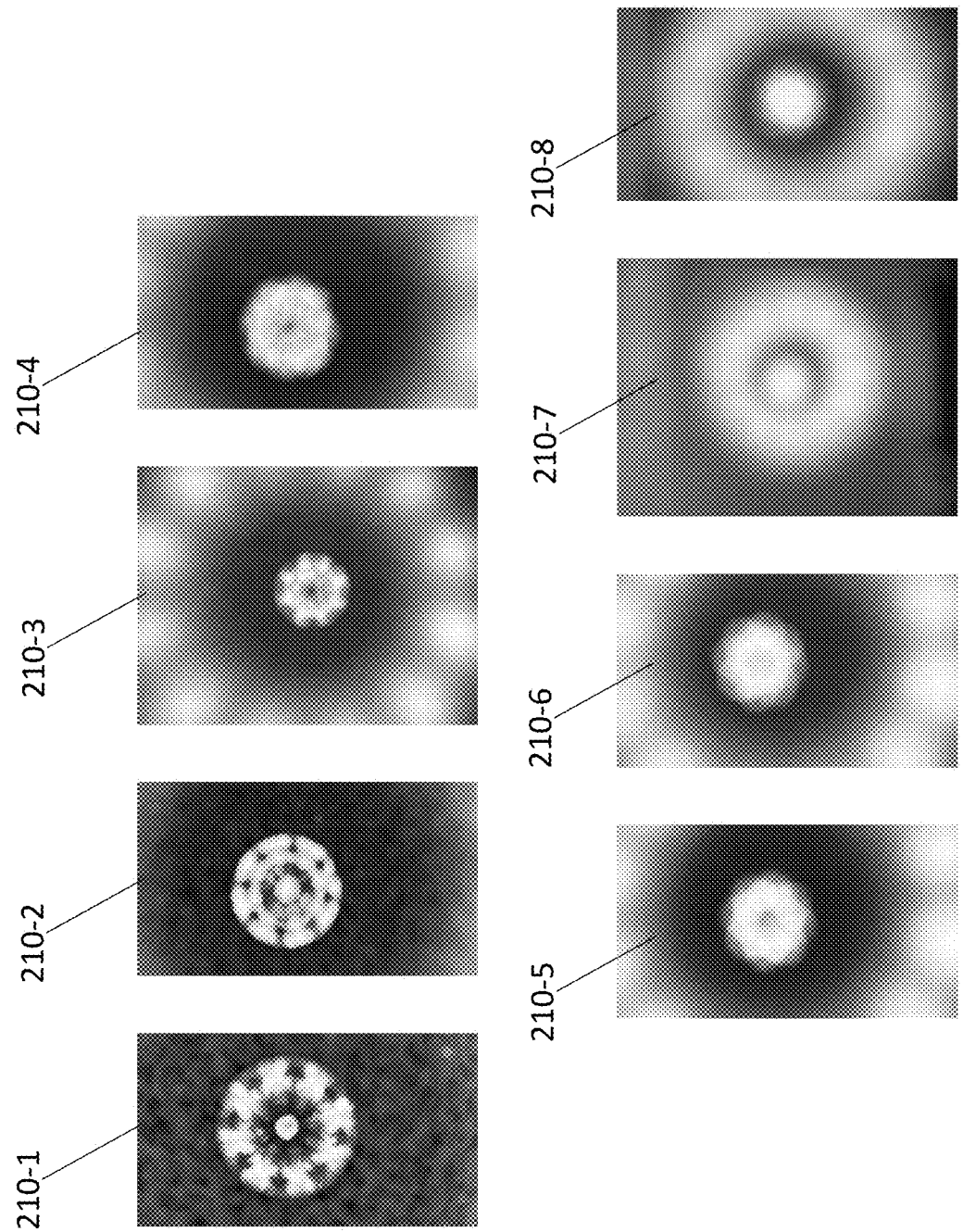
FIG. 2B is a set of images of a gemstone captured by the gemstone imaging and evaluation device at different focal points and at different distances.

For example, FIG. 2B includes eight top-view images 210-1 to 210-8 of an upright gemstone 150, particularly a diamond, captured by the image capturing component 120 at eight different focal settings which are underfocused. The diamond can be positioned face up, and illuminated in a darkened room. Alternatively, the diamond can be illuminated in a lighted room under various lighting conditions. Halos, petals, fuzzy light return, and pixels in the images can then be extracted. In addition, the colors of the diamond can be extracted more easily under various imaging methods for various predetermined foci. The color or colors of the gemstone 150 can be identified, and patterns and light distributions of the gemstone 150 can be analyzed for patterns, light distribution, etc., to be mapped and graded objectively. FIG. 2C is another example of a gemstone, particularly a princess cut diamond, with different focal settings. Image 220-1 shows the diamond in an almost overfocused state which is not totally in-focus, and image 220-2 shows the diamond in an overfocused state.

For purposes of discussion, and without limitation, the example neural network-based image analysis algorithms are described as being performed on a set of images in which at least one image is captured with the image capturing component 120 in each of an overfocused setting, a focused setting, and an underfocused setting. It should be understood that more or fewer focused, underfocused, overfocused, or out of focus images can be captured and analyzed depending on the type of gemstone characteristic being evaluated. For example, the captured images can be only a single image at a single focal setting, such as an overfocused image, or can be a set of images at a single focal setting. It should also be understood that the training data set can be made up of just one set of focus type or focus points, or a combination of one or more focus types of images. Such gemstone characteristics can include the type of gemstone. Each gemstone has various characteristics, such as diamond characteristics which are different from ruby characteristics. For instance, a plurality of images can be captured focused optical settings, or underfocused settings, or overfocused settings, or combinations of the foregoing. Alternatively, the at least one image is captured in at least one of an overfocused setting, a focused setting, and an underfocused setting.

In an embodiment, the processing unit 124 includes a machine learning module 154 including one or more supervised machine learning systems or one or more unsupervised machine learning systems. The machine learning module can include, for example, a Word2vec deep neural network, a convolutional architecture for fast feature embedding (CAFFE), an artificial immune system (AIS), an artificial neural network (ANN), a convolutional neural network (CNN), a deep convolutional neural network (DCNN), a region-based convolutional neural network (R-CNN), a you-only-look-once (YOLO) approach, a Mask-R-CNN, a deep convolutional encoder-decoder (DCED), a recurrent neural network (RNN), a neural Turing machine (NTM), a differential neural computer (DNC), a support vector machine (SVM), a deep learning neural network (DLNN), a naive Bayes, a decision tree, a logistic model tree induction (LMT), an NBTree classifier, a case-based module, a linear regression module, Q-learning, temporal difference (TD), deep adversarial networks, fuzzy logic, K-nearest neighbor, clustering, random forest, rough set, or any other known machine intelligence platform capable of supervised or unsupervised learning.

Figure 3:
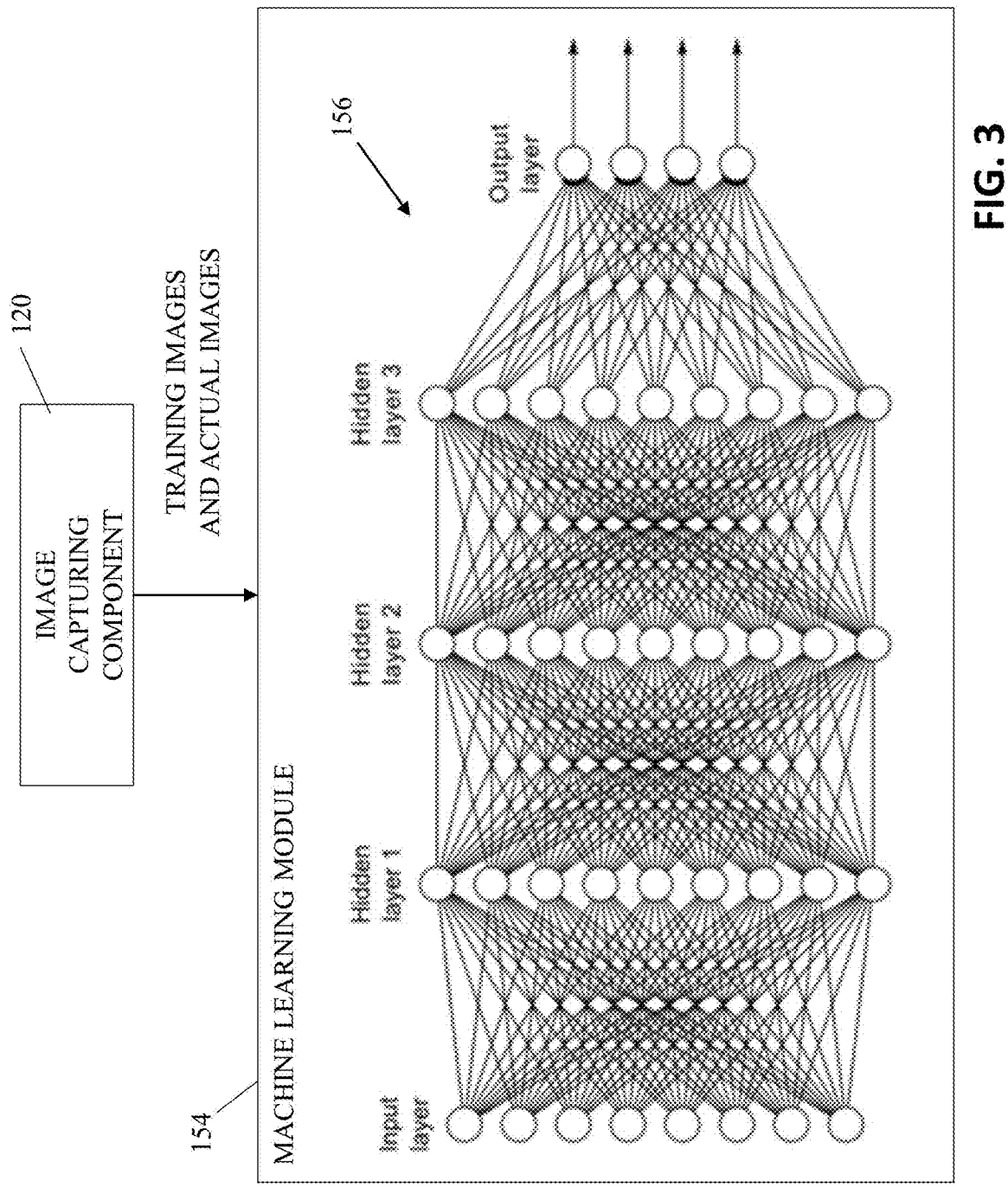
FIG. 3 is a schematic of a machine learning module including a neural network used in the system of FIG. 1A.

For example, as shown in FIG. 3, the machine learning module 154 includes a neural network 156 having a plurality of nodes or artificial neurons arranged in a plurality of layers, including an input layer, at least one hidden layer, and an output layer. The neural network 156 is configured to receive at least a portion of an image at the nodes of the input layer. In particular, the neural network 156 is configured to receive and be trained by a plurality of training images depicting gemstones, for example, as captured using the image capturing component 120. The training involves receiving such training images, and configuring the connections and connection weights between the nodes of each of the layers. For example, the training images can include sets of images such as the eight top-view images 210-1 to 210-8 of the upright gemstone 150 captured at eight respective focal settings, which are each different, as shown in FIG. 2B. The training image sets are preferably captured from a plurality of different gemstones. The training image sets can be captured under different conditions and different settings so as to train the neural network 156 to be robust to varying devices, conditions and settings. For instance, different image sets can have different combinations focal settings, different positions of the camera relative to the gemstone, use different camera devices and thus settings, different optics, different lighting conditions, among other possible differences. In addition, other image types can be used as training images, such as an image with no gemstone or no visible light return can be a null image for training the neural network 156. Other image types can include images with auto exposure (AE) locked, as well as images in which the distance traveled of the gemstone is greater than the light receivable at the AE locked position. Alternative image types can also include false images. Such false images can have nothing to do with the gemstone or the product or item of jewelry having such gemstones. By including such false images in the training image sets, the machine learning module 154 can learn what objects to avoid in evaluating the gemstone or a product or item of jewelry having such gemstones.

In addition or alternatively, the training images can be augmented by computationally changing existing training images. For example, the eight top-view images 210-1 to 210-8 shown in FIG. 2B can be flipped about an axis, or can be rotated by one or more angles, such as 45 degrees and 90 degrees. After the neural network 156 is trained by the training images, the neural network 156 is configured to receive and process at least one query image of a test gemstone 150 from the image capturing component 120. For example, a query image of the test gemstone 150 to be evaluated is received at the input layer from the image capturing component 120, and processed by the layers of nodes of the neural network 156. The output layer generates at least one signal indicating an identification and classification of at least one feature of the test gemstone 150 determined from the query image. Other known training methods can be implemented to train the neural network 156. Alternatively, other known training methods can be implemented to train the machine learning module 154.

The captured query image of a gemstone 150 can be analyzed by the processing unit 124 implementing the neural network 156 performing neural network-based algorithms, as well as other image processing and gemstone evaluation techniques to identify and analyze a variety of physical characteristics of the gemstone 150. The other image processing and gemstone evaluation techniques can include ranking or slotting the images or the outputs of the neural network 146. The ranking or slotting can be performed based on the corresponding grades of the gemstone 150. For example, for a color of the gemstone 150, a D to Z scale can be used for diamonds. Alternatively, a D to E scale can be used to slot a color of a diamond relative to another diamond having a very nearby quality. The D scale can range from D0 to D100, or D1 to D100, and the E scale can range from E0 to E100, or E1 to E100. Such grades can be shown, or can be graded objectively. The algorithms for analyzing images of a gemstone or a jewelry item configure the processing unit 124 to extract one or more of a variety of physical features of the gemstones from the images including, without limitation: a scintillation or sparkle, a color, a pattern, a size, a dimension, a symmetry, a light return or performance, a finishing, a cut grade, a clarity, a treatment, a facet, or the carat of the gemstone, inclusions in the gemstones, scratches on the gemstones, dust or particles on the gemstones, a table facet structure of gemstones, a girdle structure of gemstones, gemstone girdle features, angle and height of gemstones, pavilion depth and angle, crown height and angle, weight and color of the gemstones, coverage of the gemstone surface area, identification markings or inscriptions on gemstones, etc.

The algorithms for analyzing images of a gemstone and jewelry item configure the processing unit 124 to extract one or more of a variety of physical features of the jewelry item including, any of the gemstone features noted above, identification markings or inscriptions on the metal part of prongs holding gemstones, metal part dimensions, volume, angle, color, weight, metal quality, and caratage, nicks, scratches, dents, cracks on the metal part or gemstones, distance between the prongs, how the prongs are placed with respect to one another and with respect to the gemstones, height and thickness of the prongs, facet structure and angles of the prongs, angle of curvature of a prong and its angle facing other prongs, how relatively high the gemstone is set in comparison to the prongs and to the other gemstones, and placement of the gemstones in relation to the prongs. Coverage of the gemstone surface area measures whether the gemstone surface is too short such as near an edge, too high towards a table, a correct distance, or whether a gemstone is missing.

The information mentioned above is exemplary and should not limit the scope of the invention. It should be clearly understood that the processing unit 124 can be configured to extract any other information from the actual gemstone images required for analysis of the gemstone or the jewelry item. It should also be understood that, additionally or alternatively, in some embodiments, multiple gemstones 150 can be analyzed at the same time in accordance with the techniques described herein.

Figure 4A:
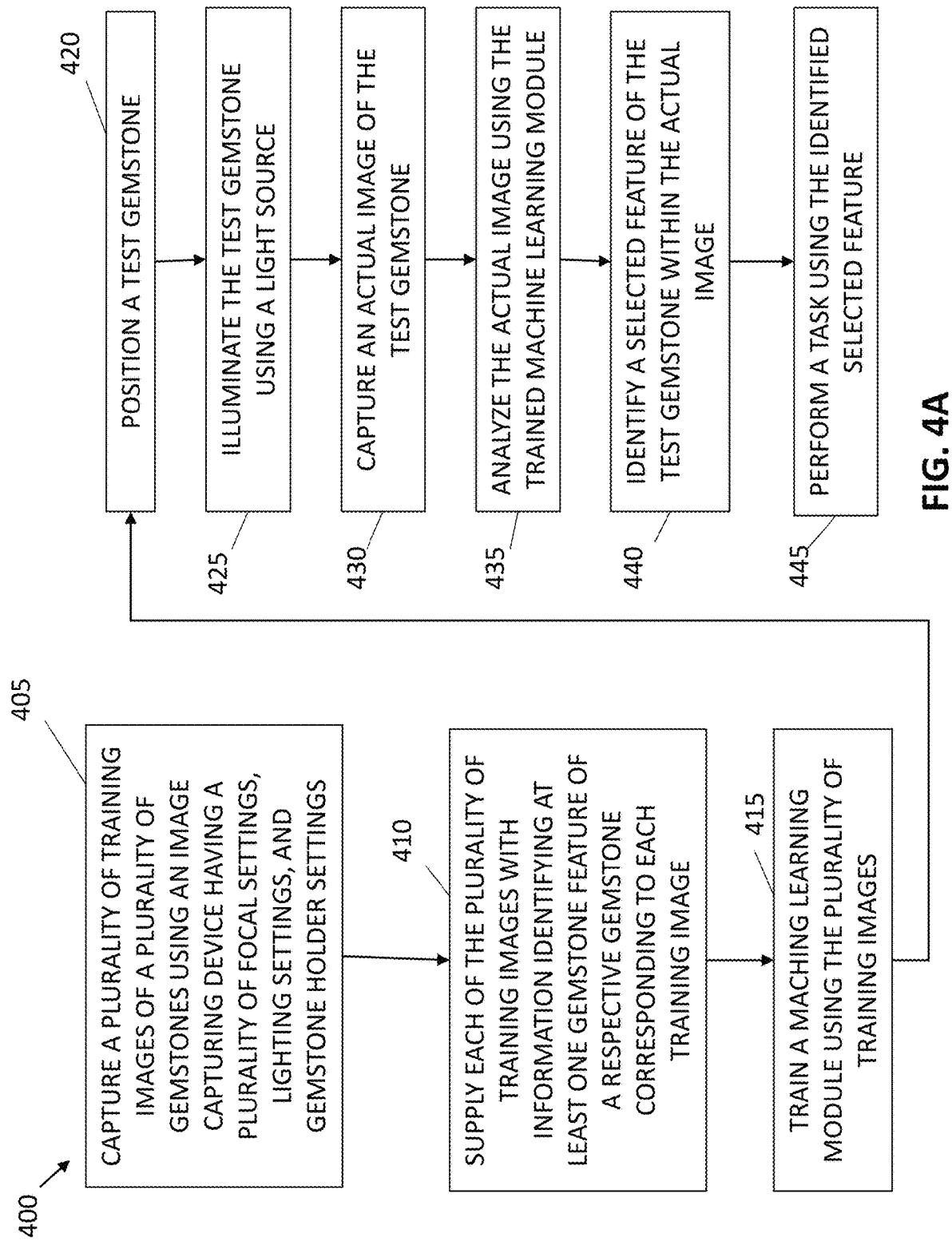
FIG. 4A is a flowchart of an overall method of operation of the system of FIG. 1A, according to the embodiment.

FIG. 4A is a process flow diagram of an exemplary method 400 for detecting features of a gemstone from images captured using system 100 according to an embodiment. For example, the method 400 is described as being implemented using the processing unit 124. It should be understood that portions of the method 400 and other methods disclosed herein can be performed on or using a known custom or preprogrammed logic device, circuit, or processor, such as a programmable logic circuit (PLC), a computer, software, or other known circuits, such as an ASIC or a FPGA, configured by code or logic to carry out their assigned task. The device, circuit, or processor can be, for example, a dedicated or shared hardware device such as a laptop, a workstation, a tablet, a smartphone, part of a server, or a dedicated hardware circuit, as in an ASIC or a FPGA. The device, circuit, or processor can also be or can include a computer server, a portion of a server, or a computer system. The device, circuit, or processor can include a non-transitory computer readable medium (CRM), such as read-only memory (ROM), a flash drive, or a disk drive storing instructions that, when executed on one or more processors, cause portions of the method 400 or other disclosed methods to be carried out. It should be noted that in other embodiments, the order of the operations can be varied, and that some of the operations can be omitted. The device, circuit, or processor can also include a user interface equipped with a touch screen, such as a touch screen of the image capturing and gemstone evaluation device 112, or a touch screen of a mobile phone, to permit computer interaction.

At step 405, a plurality of training images of a plurality of gemstones are received or captured using the image capturing component 120 of the gemstone evaluation device 112. For example, the image capturing component 120 can capture still images, video, or a sequence of still images from a video. The image capturing component 120 has a plurality of different focal settings, different lighting settings, and different gemstone holder settings. More specifically, at step 405, the image capturing and gem evaluation device 112 can be configured to capture a set of images of a gemstone using different focal settings including at least one image captured while focused on the gemstone or a portion thereof, at least one image captured while under-focused, at least one image captured while defocused, and at least one image captured while over-focused. A defocused image can be an image in which features are not visible, such as when the image is all dark or black. Such focused, under-focused, defocused, and over-focused images can be configured as a varied focus image set.

At step 410, each of the plurality of training images is supplied with information identifying at least one gemstone feature of a respective gemstone corresponding to each training image. Such information can include one or more of the features listed below: a type of gemstone, a type of treatment performed on the gemstone, a determination of whether the gemstone is natural or man-made, the presence of a gemstone holder, a scintillation of the gemstone, a sparkle, a brilliance, a color, a pattern, a size, a shape, a cut grade, a dimension, a symmetry, a light return or performance, a light pattern returned, a pattern of light that falls on or around an imaging surface, a circle or other patterns of light created by a lighting device, a pattern of the light such as laser light or other types of light that comes out of or is imaged coming out of the gemstone, a light color, a background color, a foreground color, a finishing, a cut grade, a clarity, a treatment, a facet, a girdle information, or the carat of a gemstone, inclusions in the gemstones, scratches on the gemstones, dust or particles on the gemstones, other objects in the image, a table facet structure of gemstones, a girdle structure of gemstones, gemstone girdle features, angle and height of gemstones, pavilion depth and angle, crown height and angle, weight and color of the gemstones, coverage of the gemstone surface area, identification markings or inscriptions on gemstones, etc., as well as reasons for the features of a gemstone such as an inclusion, and responses to the features of a gemstone such as scintillation. Any other information can be included in the plurality of training images, such as user defined information, predefined information, or information as needed to receive a particular result.

At step 415, the neural network 156 of the machine learning module 154 is trained using the plurality of training images. Such training can include receiving such training images at the neural network 156, and reconfiguring the connections and connection weights between the nodes of each of the layers, as shown in FIG. 3.

It should be understood that a given neural network model can be trained to detect and evaluate a plurality of gemstone features. Similarly, a given neural network model can be trained with a focus on detecting and evaluating at least one specific kind of gemstone feature.

As a non-limiting practical example, an exemplary approach for training a neural network model for analyzing inclusions in a gemstone is further described below.

The set of training images comprises images of, for example, 1000 gemstones. The images can comprise 700 sets of images for training purposes, and 300 test images for purposes of validating the trained neural network.

Along with the one or more images of each gemstone, ground truth information about each gemstone and image is provided to the neural network 156. For example, ground truth information about a given gemstone can include a description of high-level subjective/objective features, such as clarity. For instance, a clarity grade (e.g., FL (flawless), IF (internally flawless), VVS1 (very very slightly included), and so on) is provided for each gemstone. Preferably, to adequately train the neural network 156 to detect each feature of interest. the training image set is curated to have a statistically significant sample size and variability. For instance, images from 100 VVS1 stones, 100 IF stones, 100 VVS2 stones, and so on, can be utilized for purposes of training the neural network 156 to perform inclusion detection.

Ground truth information about each gemstone can also include the location and classification of specific physical features of interest present in the gemstone. For example, a segmentation can be performed for each gemstone image to specify the location of each inclusion in the gemstone and each inclusion can be further classified by type. The location of each inclusion can be specified by drawing a bounding box around the inclusion shown in an image, by masking the edge of the inclusion (e.g., by drawing a boundary line around its outer edges), providing the location using coordinates, and the like. Additionally, for each inclusion its classification is provided, for instance, specifying the color/type of the inclusion (e.g., black, white, etc.). The types of inclusions can also include, for example, a cloud, a feather, a pinpoint, or any other known type of inclusion. Furthermore, other features showing in an image that relate to the gemstone feature in question (e.g., an inclusion) can be similarly segmented and classified. For instance, reflections or shadows that are caused by an inclusion can be identified by location and classified by type.

Ground truth information can similarly include the location and classification of other features of the gemstone including, for example, scratches, polishing marks, internal patterns created due to formation of the source rock of the gemstone, the edges and facets of the gemstone.

Ground truth information can similarly include information (e.g., a type, grade/value, location) describing other features of the gemstone, such as its color, color variations present in the gemstone among any other type of feature of interest.

Ground truth information can also include the location and classification of other light features shown in the image that result from the physical features of the gemstone itself. For instance, these light features can include the light reflections off the gemstone's facets, edges, inclusions, and other such physical features. It should be understood that salient reflections or shadows can include those that present on or within the gemstone in an image as well as those that might show on surfaces surrounding the gemstone in the image. More specifically, salient light reflections captured in an image can include the unique shapes and patterns of light formed or reflected off of surfaces around the gemstone (e.g., the base 115, the gem holder 126, mirrors and other such surfaces in the imaging area) and that are caused by light being reflected, refracted, diffracted or transmitted by the gemstone. Such light features presenting in the images are also referred to herein as a "halo," an "aura," or "hologram." In addition, light features can be referred to as a "petal", or their various unions, their various intersections, or their unions over intersections.

Ground truth information can also include the location and classification of other features shown in the image that may not result from the physical features of the gemstone itself. For instance, these features can include image artifacts, light reflections off of other objects such as a gem holder, jewelry item, the base surface and the like. In this manner, the neural network 156 can be trained to ignore, and even remove unwanted or unimportant image features and image artifacts caused by poor conditions, defective lenses and the like. It should be understood that any combination of image features and artifacts, whether salient or not, can be one or more of segmented, classified, graded and provided to the neural network as ground truth information for a given gemstone and/or gemstone image.

In addition to the ground truth information concerning features depicted in the images, ground truth information can also comprise image capture settings for respective images. Image capture settings is a general term intended to refer to the camera settings, lighting settings and the arrangement of the camera, lighting, gemstone, gemstone holder, etc. when a given image is captured. For instance, such image capture settings can include the type of imaging component, the focal setting (e.g., focal length, focal point etc.), a type of lens, the lens arrangement or setting, the lighting configuration (e.g., light source location, type, intensity, wavelength), a position of the camera and/or light source relative to the gemstone (e.g., distance, angle and the like), the gemstone's orientation, among other such parameters.

Once the neural network 156 is trained with given ground truth information, upon receiving a query image of a gemstone 150, the trained neural network 156 can output an identification of a feature shown in the query image as to whether the feature is an inclusion or not, as well as a probability value measuring the probability that the feature is an inclusion. In addition, the trained neural network 156 can output the location of an inclusion in the gemstone 150, as well as what type of inclusion is detected.

For all other features in a query image identifiable through training of the neural network 156, the trained neural network 156 can provide the same information for a given feature. For a given feature, the trained neural network 156 can output an identification of the given feature shown in the query image as to what the feature is as associated with the gemstone 150, what is the probability of identification of the feature, and a location of the feature in the gemstone 150. Using the I/O device 126 described above, such as the GUI, a user can increase or decrease a probability threshold, to show only those identifications of a feature with at least a probability of identification at or above the selected threshold. For example, for a facet of the gemstone 150 in a query image identifiable through training of the neural network 156, the trained neural network 156 can output an identification of the facet associated with the gemstone 150, what is the probability of identification of the facet, and a location of the facet in the gemstone 150.

For a location output by the trained neural network 156 for a given feature, the location can be represented as an output from the I/O device 126, such as a printed output or a graphical image on a display. The location in the output from the I/O device 126 can be represented as a bounding box shown on a printed or displayed image of the gemstone 150, with the bounding box surrounding the given feature at the corresponding location. Alternatively, the location can be represented by a set of data points output by the I/O device 126, with the set of data points including coordinates of all identified features and other feature data in the query image of the gemstone 150. In a further alternative embodiment, the location can be represented by vectors of multiple responses output from the trained neural network 156 which can be represented onto a single resulting image from the I/O device 126.

In addition, in another embodiment, the I/O device 126 can transpose one or more of the different types of features onto an output photo generated from the query image. Alternatively, the different types of features can be transposed on a line diagram such as a chart. The determined features in the query image which are detected by the trained neural network 156 can be further output in various known visual ways, such as a three-dimensional (3D) representation of the test gemstone 150 with the determined features superimposed on the three-dimensional representation.

The outputted response of the trained neural network 156 for detection of a first feature can be shown separately from the outputted reasons from the trained neural network 156 for detection of a second different feature. For example, the outputted response of the trained neural network 156 for facet detection can be shown separately from the outputted response from the trained neural network 156 for inclusion detection.

The computations of the machine learning module 154, such as the processing of the trained neural network 156, can be performed on any known computing device or any known combination of computing devices. For example, some of the computations can be performed on a phone, while some other computations can be performed on one or more servers. Such phones or servers can be a portion of the external gemstone evaluation platform 118 shown in FIG. 1B. The various computations by the various computing devices, such as phones and servers, can then be combined and output by the I/O device 126. For example, the computing devices can be connected to the network 114 shown in FIG. 1B, and so the computations from the computing devices can be conveyed through the network 114 to the I/O device 126.

In addition, the neural network 156, which is subsequently trained to detect gemstone features, can be a pre-trained neural network that has already been trained to detect other types of objects and features of such objects, such as detecting and identifying entities such as a dog or a cat, as well as the characteristics of such objects including a shape, color, size, and other physical aspects of objects. Alternatively, the neural network 156 can be configured to work with relatively large objects, or otherwise can be configured to work with relatively small objects, such as gemstones. Any mistakes in the detection or classification of objects or features can be resolved by retraining the neural network 156 with the same images. Alternatively, retraining can be performed with new images. Accordingly, the mistakes can be resolved and the neural network 156 can be taught again to accurately detect or classify objects or features.

As described above, the neural network 156 can be a convolutional neural network (CNN). Alternatively, the neural network 156 can be any type of deep learning neural network 156. The neural network 156 can also be one of or a combination of different known neural networks 156 and machine learning modules 154, such as a Word2vec deep neural network, a convolutional architecture for fast feature embedding (CAFFE), an artificial immune system (AIS), an artificial neural network (ANN), a convolutional neural network (CNN), a deep convolutional neural network (DCNN), a region-based convolutional neural network (R-CNN), a you-only-look-once (YOLO) approach, a Mask-R-CNN, a deep convolutional encoder-decoder (DCED), a recurrent neural network (RNN), a neural Turing machine (NTM), a differential neural computer (DNC), a support vector machine (SVM), a deep learning neural network (DLNN), a naive Bayes, a decision tree, a logistic model tree induction (LMT), an NBTree classifier, a case-based module, a linear regression module, Q-learning, temporal difference (TD), deep adversarial networks, fuzzy logic, K-nearest neighbor, clustering, random forest, rough set, or any other known machine intelligence platform capable of supervised or unsupervised learning. For example, any new and known types of neural networks formed in the future can be used.

In an embodiment, a trained neural network 156 is initially trained for detecting a given physical feature of a gemstone 150, such as inclusions, facets, scratches, etc. The neural network can also be trained for detecting a combination of features. Some features can preferably be grouped together for analysis, such as grouping an inclusion and facets together, since the location of an inclusion in relation to facets can correlate to how inclusions are reflected, which impact appearance and light transmission characteristics of a gemstone. Similarly, facets and scratches can be grouped together, since scratches can be mistaken for facets, which also impact appearance and light transmission characteristics of a gemstone.

The trained neural network 156 can then be re-trained repeatedly to classify a test gemstone 150 based on specifically chosen features of gemstones. For example, the re-training can start with images of round gemstones, then continue with images of square gemstones, etc., with repeated training using images of other types of gemstones as well as other types of gemstone shapes. The system 100 can break down such training images into multiple sub-images, partial images, cropped images, etc., to perform training by analyzing masked parts of the gemstones in addition to larger portions of the image of gemstones, including the whole image of the gemstone.

The training of a neural network 156 can be performed to detect and classify the light response and the color of test gemstones using training images of different gemstones having diverse light responses and different colors. For example, the colors of gemstones can be obtained by extracting colors from the various pixels, sets of pixels, or groups of pixels of the images of numerous gemstones. The system 100 can also generate a heat map of the colors of each gemstone from the pixels of the images of the gemstones. It is to be understood that the images of gemstones, which are used for training the neural network 156, can be side views, top views, bottom views, front views, and rear views, as well as perspective views from various viewpoints of the image capturing component 120.

In an embodiment, the neural network trained to detect and classify features including the light response, color and the like can be the same neural network trained to detect gemstone features including inclusions, facets and the like. In addition, or alternatively, the neural network trained to detect such features including light response and color can be a different neural network model. For training the neural network 156 to detect and classify the light response of a test gemstone 150, a plurality of images of different gemstones can be captured by the image capturing component 120 using a prescribed color illumination. For example, white light at 5500K can be used to illuminate different gemstones. The plurality of images of different gemstones can also be captured by the image capturing component 120 using different focal settings to generate multiple focus image sets, for example, 1,000 sets of images having different focal settings can be used to train the neural network 156.

As described above, in addition to providing a plurality of images to the neural network 156 to train the neural network 156, ground truth information associated with each image is also provided to the neural network 156 to train the neural network 156. For each gemstone and its associated images, such ground truth information can include table proportions of the gemstone, the size of the gemstone, the proportions of a cut, a depth of the cut, the height of the crown of the gemstone, the thickness of the girdle, information about the faceting of the gemstone, other various dimensional and subjective information associated with the gemstone, a subjective property grade, image capture parameters, optical responses of light features, starting and ending touch points of facet lines which form a pattern, etc.

The other dimensional and subjective information can be provided by external sources such as a database of the external storage 116, or a gemstone laboratory which is part of a gemstone evaluation platform 118. The subjective property grade can include information regarding color of the gemstone, scintillation of the gemstone, light performance, luster, etc. The scintillation can be graded or gauged using any known standard methodology and represented in an image-based gauge. The image capture parameters can be data associated with the focal setting of the image capturing component 120, the type of image capturing component 120 such as the type of camera used, etc.

The optical response of light features can be marked out to indicate a desired characteristic of the gemstone, such as a pattern of light from the gemstone, a color of each pixel of an image of the gemstone, and an identification of the shape or orientation of the gemstone. The color of each pixel can be determined by known computer vision techniques, and can be used to create a heat map of colors of the gemstones. The computer vision techniques can also measure the cleanliness of each pixel or a set of pixels. The identification of the shape or orientation of the gemstone can include, for example, information identifying each petal of light caused by the gemstone, in which faceting of the gemstone reflecting, diffracting, refracting or transmitting light provides the appearance of a petal in some images. The identification of the shape of the gemstone can further include information indicating a difference between different petals.

The identifying information provided to the neural network 156 can also associate an identified pattern or image feature to correspond to a feature of a gemstone. In addition to various features of the gemstone described above, other features can include fluorescence, phosphorescence, milkyness, cloudiness, and dustiness of the gemstone, whether the gemstone is natural or formed by CVD or other fabrication processes, the cut type, the grade, various light formations, and other information about the features of the gemstone. For example, the system 100 can use defining rules which correlate light patterns to gemstone feature. Concentrations of light patterns can indicate, for example, a feature of the gemstone, such as the cut of the gemstone or the gemstone proportions.

In addition, the neural network 156 can be trained as a function of lighting and variable light conditions. For example, the illumination of a gemstone can be from an LED. Alternatively, the illumination can be from a laser. In another alternative embodiment, the illumination can be from an ultraviolet (UV) light. In a further alternative embodiment, the illumination can be from an infrared (IR) light. Still further, the illumination can be from a tubelight.

In addition, the illumination can be a natural light source such as sunlight. The frequencies and intensities of a LED light or a laser can be varied, can indicate directionality of the, as well as the type of light, such as whether the light is diffuse or concentrated, and whether the light has a single or multiple colors.

Further, the neural network 156 can be trained using sets of images and associated information in order to remove undesirable features of images created by inadequate or unsatisfactory imaging materials, such as defective lenses which can cause a halo effect of light, can cause dark patches, or can cause floaters, or by repeatedly causing the display of a halo. Using the trained neural network 156, an image can be modified to remove such halo effects, as well as rainbow or spectral effects, distortions of the image, etc.

Figure 4B:
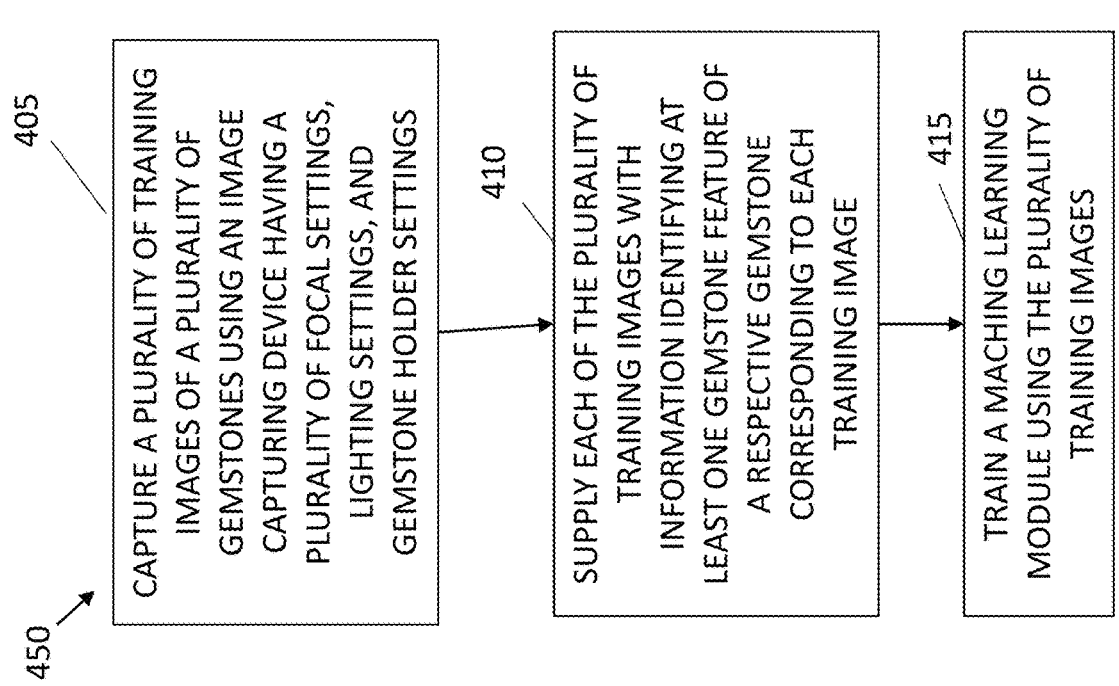
FIG. 4B is a flowchart of a method of training a machine learning module.

Returning now to FIG. 4A, as noted above steps 405-415 of method 400 are directed to the training phase in which training images and ground-truth information is provided to the machine learning module 154 so as to train the one or more neural networks 156. Steps 420-445 of method 400 further described herein are directed to the test, or application, phase, in which the system 100 comprising the trained neural network(s) are used to capture and analyze image(s) of a "test" gemstone 150 for purposes of detecting features of interest of the test gemstone. Such steps 405-415 can be performed in a method 450 as shown in FIG. 4B, in which the one or more neural networks 156 is trained. The resultant trained neural network 156 can be used with any known apparatus having a processor configured to receive and evaluate one or more images of a gemstone 150 and, optionally, capture the images using an image capturing component 120. Accordingly, the trained neural network 156 can be stored and operated in a smartphone or any other known computing device as the image capturing and gem evaluation device 112, as shown in FIG. 1B. Alternatively, the trained neural network 156 can be stored and operated in the external gemstone evaluation platform 118, as shown in FIG. 1B.

Figure 4C:
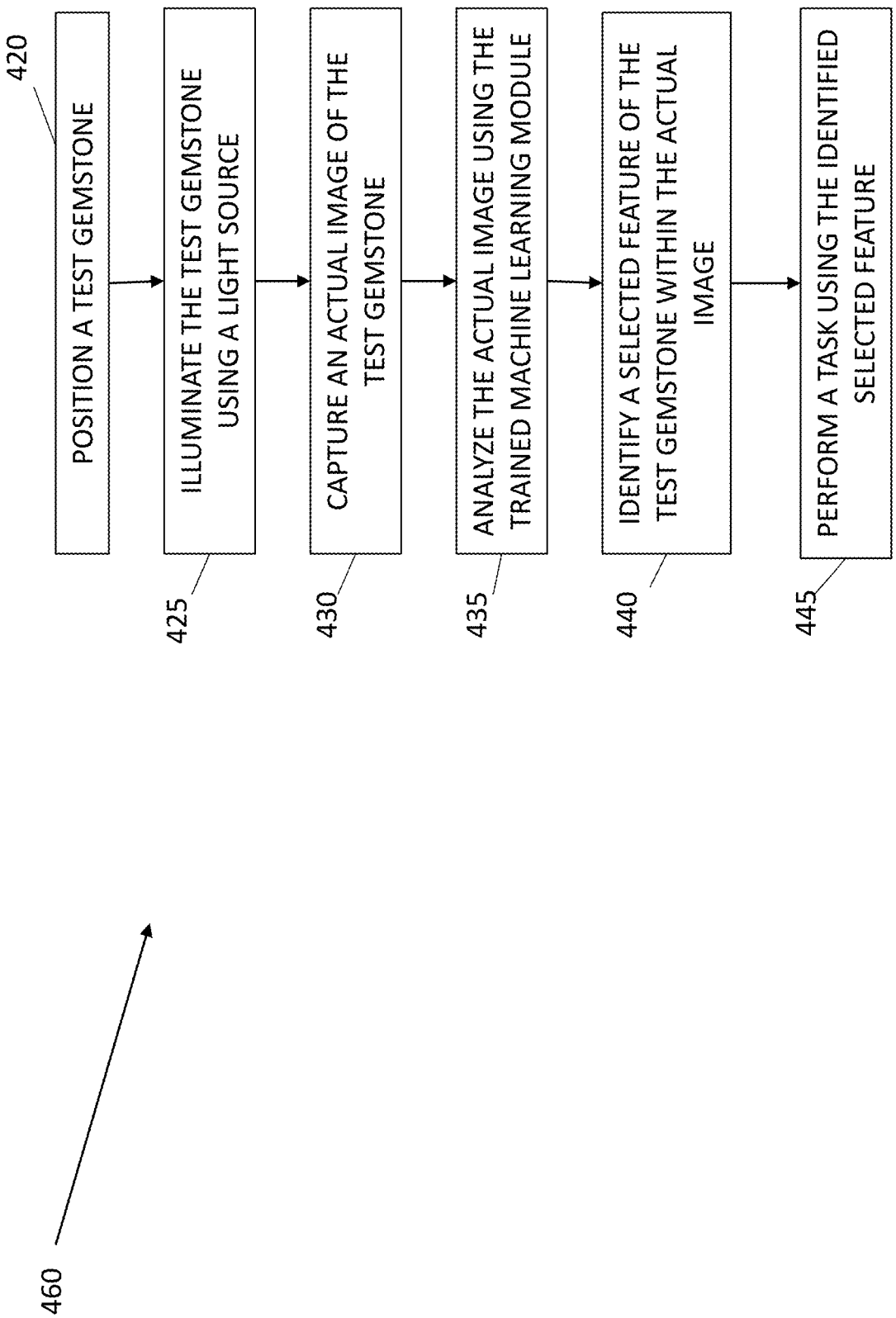
FIG. 4C is a flowchart of a method of operation of the system of FIG. 1A using a trained machine learning module.

In addition, such steps 420-445 can be performed in a method 460 as shown in FIG. 4C, in which any known apparatus having an image capturing component 120 and configured to image and evaluate a gemstone 150 can utilize an externally provided trained neural network 156. Accordingly, the training of the neural network by the method 450 in FIG. 4B can be performed separate and independent of the imaging and evaluation of a gemstone 150 performed by the method 460 in FIG. 4C.

As shown in FIG. 1A, a gemstone 150 (i.e., the test gemstone) is positioned in step 420. For example, the gemstone 150 is placed within a gemstone holder 102 in step 420. Alternatively, the gemstone 150 is positioned in or on the gemstone holder 102, on a worksurface, or on any surface, such as the hand of a person. The test gemstone 150 is then illuminated in step 425 using one or more light sources 160, such as light emitting diodes (LEDs), an incandescent lamp, a laser, a UV lamp, an IR lamp, a tubelight, or the sun. Such illumination can be orientated from above, below, or from the sides of the test gemstone 150, as required by the particular analytical method being performed. The illumination can be from 360 degrees around the gemstone. Alternatively, the illumination can be from more than one location. Furthermore, the illumination can be from more than one type of light.

In an embodiment, it can be preferable that the primary source of illumination is directed at the test gemstone 150 from above the test gemstone 150, for example, using a known halo lighting technique. It can also be preferable that the test gemstone 150 is illuminated with white light. However, certain lighting conditions, such as natural daylight, can enhance the presentation of certain features in the images or obscure features. Accordingly, in some embodiments, a varied focus image set can be captured for each of a plurality of different lighting conditions resulting in an image set that is usable to better identify gemstones and gemstone features. In such a configuration, the system 100 can comprise multiple different types of light emitters, such as LEDs, configured to emit light having different characteristics, such that one or more of a plurality of different wavelengths, colors, spectrums, and intensities of light can be directed at the gemstone. Additionally, the intensity, direction, or multiple directions, of the light shone onto the gemstone can be varied to create the different lighting conditions.

At step 430, one or more image(s) of the test gemstone 150 is captured by the image capturing and gem evaluation device 112. In the exemplary embodiment described herein, a varied focus image set is captured of the test gemstone for further processing. However, it should be understood that, as a result of the training phase, the trained neural network algorithm can be capable of detecting salient gemstone features from at least one image. Similarly, in an embodiment, multiple varied focus image sets can be captured at step 430, say, under different lighting conditions, for analysis.

At step 435, the processing unit 124 processes the varied focus image set to identify one or more physical and optical characteristics of the test gemstone 150 therefrom. More specifically, the processing unit 124, particularly the machine learning module 154 comprising one or more neural network-based models 156, as shown in FIG. 3, trained to identify one or more gemstone features of interest from the image data included in the varied focus image set. The neural network-based model can generate a vector embedding representing the features of the test gemstone 150 detected within the images as a function of its programming and training. Accordingly, the processing unit 124 can be configured to analyze images captured under different lighting conditions and different focal settings using the one or more neural network-based models to identify characteristics of the gemstone as a function of light or focal setting. In step 440, the processing unit 124 identifies a selected feature of the test gemstone 150 within the query image. Then, the method performs a task using the identified selected features in step 445. For example, the input/output device 126, shown in FIG. 1B, outputs a notification of the identified selected feature of the test gemstone 150 in step 445. Alternatively, the task can perform use cases as described below, for example, to match the color of a test gemstone with the color, such as a user-inputted color, of another gemstone. The color of the other gemstone can be received, for example, over, in, or through an app or a website, or alternative from any other known type of method or platform. Another task can be to verify the authenticity of a gemstone using the output, for example, to check if the same gemstone is identical to previously taken or stored image of the gemstone in a database. The input/output device 126 can output, for example, a TRUE or FALSE response of the verification. In another example, the input/output device 126 can output a probability, such as a percentage of similarity.

Referring to FIG. 3, the neural network 156 can implement a deep neural net model and can include, for example, tens of millions of artificial neurons, and what a given neural net model can process and thus output, such as a vector embedding, generated as a function of its programming and training, is not simply a mechanical description of the precise pixels in an image. Instead, the output of the neural network model is a high-level description of the features of the image at various levels of abstraction. The ability of a neural network model to generate a representation of the high-level abstract content of the image makes the output representations powerful for the purpose of characterizing features of an image, and thus the features of the objects depicted within the image.

In an embodiment, the neural networks are trained from training images taken at multiple focal points, in preferably the same placement, to learn what and how each gemstone feature of interest (e.g., a part of a gemstone, an architecture of a gemstone, an inclusion or other such feature in or on a gemstone, or a scattering of light) looks like under the various focal and light conditions that might be administered. Such image processing by the processing unit 124 can be performed by refocusing the image capturing and gem evaluation device 112, by running algorithms to recreate an image of the original object, or by simply determining what patterns or colors of patterns constitute any inclusion, an internal or external feature, a gemstone architecture, or non-gemstone features such as dust, metal, plastic, etc. When an inclusion or feature is not visible or recognized, such as if there is a reflection or shadow caused by a reflection, the processing unit 124 can extrapolate as to where the original inclusion may be located based on the type of gemstone, as well as the architecture of the gemstone and lighting conditions. The out-of-focus inclusions, especially such inclusions in which the light passes through, or in which the light passes around a dark inclusion, create halos, auras, light patterns, and pixel patterns that the neural network of the machine learning module 154 is trained to recognize. The neural network can also be trained to recognize any external image of various objects that are reflected onto the gemstone, the architecture of the gemstone, any inclusion, as well as features such as how the gemstone 150 appears in the image if reflected internally inside or on the gemstone, or stops light entering the gemstone 150.

In some embodiments, the gemstone holder 102 is provided for containing or supporting one or more test gemstones 150 during examination, storage, or otherwise. Exemplary systems and methods for holding, imaging, and analyzing images for one or more gemstones or jewelry items using machine vision and other techniques are shown and described in co-pending and commonly assigned U.S. Non-Provisional patent application Ser. No. 17/207,418, titled "GEMSTONE CONTAINER, LIGHTING DEVICE AND IMAGING SYSTEM AND METHOD", filed on Mar. 19, 2021, which is hereby incorporated by reference herein in its entirety.

As described above, the lens 125 of the image capturing component 120 can include a macro lens. The term macro lens is used herein as a general term. Other devices or equipment can be used, such as a much more sophisticated piece of equipment. For example, a microscope or other devices can be used, such as an electron microscope, a holographic lens, a wide-angle lens, a bi-polar lens, a multi-polar lens, a polarizer, a filter, various types of coatings, optical coatings, a multi-lens, add-on versions, or any known types of optics, optical devices, or equipment.

The image capturing component 120 can zoom, perform multi-focal locks, perform optical changes, and perform optical tracking either by itself automatically or by software-implemented applications. The image capturing component can include a laser, LIDAR, or other distance measuring systems. The image capturing component can be configured to allow an external device or a smart phone having the instruments and lenses described herein to take the distance readings and input the readings for integration into the gemstone evaluation system 100, its training and testing methodologies.

The system 100 can comprise a gemstone holder 102 or base 115 comprising a movable or foldable reflective surface that can bend at angles to highlight a specific portion of the gemstone 150, in order to capture images of the gemstone at certain angles. The light source 160 can comprise stationary or movable lights that can be configured to focus the emitted light to a point, or to spread out the emitted light as needed to cover the gemstone 150. The gemstone holder 102 or base 115 can also be configured to reduce the external, surrounding, or ambient light that may interfere with the readings. The gemstone holder can have one or more shapes and contours, as well as a flat plate-like surface configured to allow the imaging device to touch or almost touch a surface of the gemstone 150 or the gemstone holder 102.

The system 100 can be configured to allow light to enter as well as receive the returned light to send images of the gemstone 150 to the imaging device described above. The processing unit 154 can split the images, can use the image capturing component to take split images, or can merge split images. The resulting processed image can be sent to other devices or processors configured to further process the image. The light source 160 can comprise different types of lights of different natures, shapes, colors, size, speeds, wavelengths, strengths, directions, and spread of illumination. The lens 125 can be a simple lens, with the light source 160 and imaging components 120 being separate from the lens. The lens 125 can be a single lens or a system of lenses, with a single focal point or multiple focal points configured to focus on one or more portions of the gemstone 150. The lenses can have different placements and directions configured to image the gemstone 150. The lens, camera, and other components of the system 100 can be controlled and adjusted manually, semi-automatically, or fully automatically by a processor.

The illumination of the gemstone can be enhanced with a reflector or a mirror inside or around the lens system. Alternatively, the reflector or mirror can be placed at one or more areas, distances, or directions that can direct the light to a given position either as a single point or multiple points. The light can be spread out or can be in clusters and patterns spreading light in various angles, colors, or patterns. The light can be controlled so as to flash in a pattern or randomly, and can also be tuned to a shutter or an image-taking actuator, such as a user-pressed button. The lens 125 can be a clip-on lens, an attached lens, a built-in lens, or other known types of lenses as well. More than one lens of the same type or different types can be used and can be positioned at more than one location around the gemstone 150.

In an embodiment, a stand can be used as the gemstone holder 102. The stand can be automated, semi-automated, semi-automatic, or manually controlled, which can be used as an imaging and lighting device holder as well as a distance gauge or measuring device as well, if needed. One or more known distance gauging devices or mechanisms can be implemented to gauge or measure the height or distance travelled from, for example, a top of the gemstone 150. Such distance gauging devices or mechanisms can allow for holding the position or multidirectional movement of one or more of the distance gauging devices or mechanisms. The starting point of the gauging can take into account configurations in which the gemstone holder 102 is a container or box within which the gemstone is held, such as the height and the distance of the top surface of the container to the actual gemstone surface within the container, including a thickness of a cover or viewing pane. The gemstone holder can also be taken into consideration while measuring or gauging the one or more distances, heights, and widths of the gemstone 150. The user can input measurements of the gemstone 150, of a container holding the gemstone 150, or of any size of known objects. The measurements can also be distances or spreads of the container or other objects relative to the size of the gemstone 150.

The characteristics of the container or box can also be used to train the neural network 156 to recognize and classify gemstones in such a box. As shown in FIG. 2F, images 250-1, 250-2 illustrate a set of small diamonds in a black box with an open glass window. Image 250-1 is focused, while image 250-2 is unfocused. The glass window surface reacts differently from a plastic window or from a gemstone in the open due to the refractive index of the window as well as the cleanliness or greasiness of the window. By using different materials for the box and the window, in addition to different focal settings, a training set of images with different image characteristics can be used to train the neural network 156.

The system 100 also includes the light source 160. The light source 160 can comprise light emitters such as LEDs or any other known types of light emitting devices for illuminating the top or sides of the gemstone 150. Alternatively, the light source can be exposed on or otherwise configured to shine through the top surface of the base 115 to illuminate the gemstone 150 from below. For example, in an embodiment, LEDs are exposed through openings in the base 115. By way of further example, the LEDs can be embedded below the top surface of the base 115 and can shine through the top surface of the base 115.

Figure 2D:
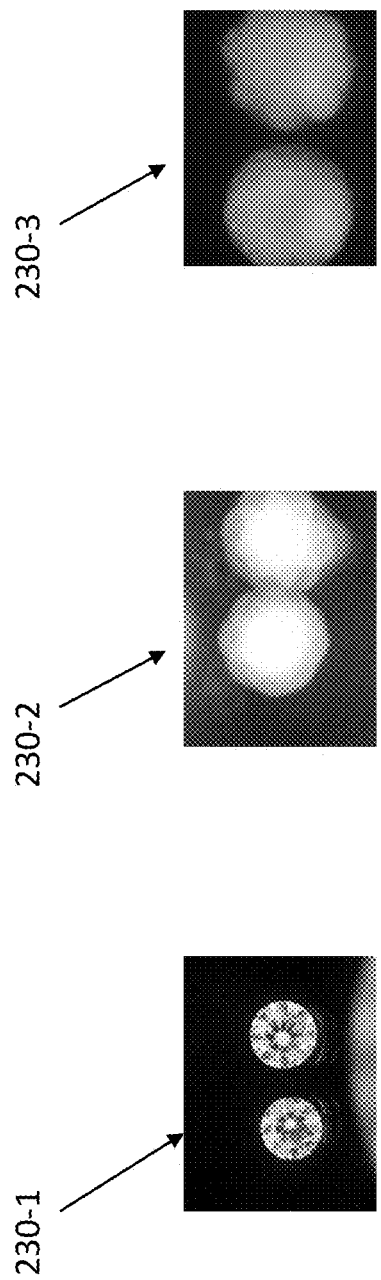
FIG. 2D is a set of images of a natural gemstone and a man-made gemstone captured by the gemstone imaging and evaluation device.

In some embodiments, the light source 160 can be configured to emit light having one or more of a variety of possible colors and wavelengths. In some embodiments, the light source 160 has an adjustable intensity. Various properties of the light emitted by the emitters (e.g., LEDs and lasers) comprising the light source 160 can be controlled, such as color, intensity, and other properties, individually or collectively, as well as the focal settings of the light emitters. Such properties of the emitted light can be selectively controlled by a controller via embedded electronic circuitry which is used to power and connect the controller to the emitters. For example, as shown in FIG. 2G, images 260-1 through 260-3 can be obtained from a diamond placed in an opening of a cylinder. Alternatively, the diamond can be placed in any known object, such as an opening of gemholder. Prongs can optionally hold the gemstone. As light is moved back and forth on the gemstone from above, from below, or from the side of the gemstone, the generated patterns of light are created as shown in FIG. 2G. Such patterns can be imaged, saved, and verified later. For example, the patterns can be saved in a database. The database can be in the memory 122 or the external storage 116 shown in FIG. 1B. Using a white LED ring light, the image 260-1 of the diamond in-focus is obtained. Alternatively, laser light such as red laser light or any other known color of laser light can be emitted from below, from above, or from the side of the diamond to obtain the image 260-2 of the diamond.

The light can be emitted by two or more light sources, which can be identical or which can be different. For example, the light sources can have varying properties. The light sources can also have varying intensities, varying wavelengths, or varying frequencies. Such light sources can generate specific patterns or features from the gemstone, with the specific patterns being highlighted. Alternatively, some of the lighting can be negated or added to due cross-lighting, such as in a three-dimensional (3D) image, which provides a viewable or extractable type of lighting output. For example, the lighting output of the gemstone can be treated like a fingerprint of the gemstone. Alternatively, the lighting can be a readable output that can easily be examined by humans. Still further, the lighting can be readable by a neural network or any other known artificial intelligence (AI) or machine learning method. In one embodiment, laser light emitted from or passing through the gemstone can be read off of any surface, such as an intermediary surface. The intermediary surface can be composed of paper, cloth, or any material or object which allows the light to be visible on any side of the intermediary surface.

The light illuminating the gemstone can be laser light, LED light, light from a light ring. Any known imaging methods can be used to remove unwanted light. The unwanted light can be extra light or diffused light. Accordingly, the remaining light can highlight just the most concentrated or powerful light responses from the gemstone, such that a clearer pattern of points of light can be visible. In addition, the distances, shapes, or designs of the light responses can be more clearly imaged, causing the system 100 to more easily to verify the gemstone for security purposes, as described herein. By changing the light properties as well as focal settings of the light emitters as described above, images of a gemstone can be obtained which can then be used as a training set to train the neural network 156 to recognize and classify the gemstone. In particular, the different light characteristics of the images 260-1 through 260-3, such as brightly highlighted parts of the gemstone, stand out and can be detected by the neural network 156 and used as an optical fingerprint of the gemstone.

The one or more light sources 160 can have meters or other recording devices configured to check or to be a failsafe device to control and regulate the one or more light sources 160. The one or more light sources 160 can have a cool white light or warm light of known colors and wavelengths. Such colors and wavelengths of the emitted light can be specified based on a type of gemstone. The light source 160 can use known types of lenses mounted to a smart phone having a lighting system to adjust the manner in which the gemstone and surroundings are irradiated.

In addition or alternatively to adjusting the focal settings of the optics of the image capturing component 120, images at different respective focal points can be effectively achieved by altering the distance of the image capturing component 120 relative to the gemstone 150 while maintaining the image capturing component 120 at a prescribed focal setting. Such distance altering can be performed by changing the height of an adjustable mount 113, as shown in FIG. 1A. Thus, in an embodiment, the processing unit 124 of the image capturing and gem evaluation device 112 can cause the image capturing component 120 to adjust the optical focus automatically. In a manual setting, the user can be guided to move the image capturing component 120 toward and away from the gemstone 150. Additionally, in some embodiments, the system 100 can comprise an automated stand as the mount 113 on the base 115 configured to hold the image capturing component 120. The system 100 can also be configured automatically move the image capturing component 120 relative to the gemstone 150 using, for example, a linear actuator controlled by the processing unit 124. In another embodiment, the image capturing component 120 can incorporate laser scanning technology, or other known systems for imaging a gemstone.

Various applications of the system 100 using the machine learning module 154 can perform objective evaluations of gemstones 150 or other items, such as jewelry. For example, the system 100 can distinguish between a natural diamond and a lab-created diamond made by a carbon vapor deposition (CVD) process, or by a high pressure high temperature (HPHT) process. Accordingly, the system 100 can provide security in determining genuine and natural gemstones 150 or artificially fabricated gemstones. Also, the luster of a gemstone 150 can be objectively determined using the system 100 by finding a pixel distribution pattern, a spread in pixels per square length of measurement in an image, the pixel colors, the pixel brightness, and various other features of the pixels in a query image of a gemstone 150. In such computational manners described above, the luster of a gem can be objectively determined instead of being subjectively opiniated by a gemstone dealer.

In additional applications, the system 100 can objectively determine a scintillation or sparkle, a color, a pattern, a size, a dimension, a symmetry, a light return or performance, a finishing, a cut grade, a clarity, a treatment, a facet, or the carat of the gemstone 150. The system 100 can further bifurcate or distinguish the gemstone 150 from a gemstone holder 102, from a setting of the gemstone 150, and from other gemstones.

Evaluating Scintillation

The machine learning module 154 can also be trained to objectively measure the scintillation of a test gemstone 150. The scintillation of a gemstone are sparkles or flashes of light of one or more colors, such as red, green, blue, or other colors, in various locations of the gemstone 150, with the sparkles of light having various shapes and sizes. Once trained, the machine learning module 154 can objectively measure such colors, locations, shapes, and sizes of the sparkles of light. In one embodiment, the image capturing component 120 can control the lens 125 or the light source 160 to direct light to a different gemstone at different angles to capture a plurality of training images having different scintillations. The lens 125 or the light source 160 can be motorized, for example, with servomotors. Such motorization can be controlled using the processing unit 124. Alternatively, the gemstone holder 102 can be configured to move different gemstones by translation or by rotation, allowing the image capturing component 120 to capture a plurality of training images having different scintillations. In one embodiment, the holder 102 can be motorized, for example, with servomotors under the control of the processing unit 124.

Figure 5A:
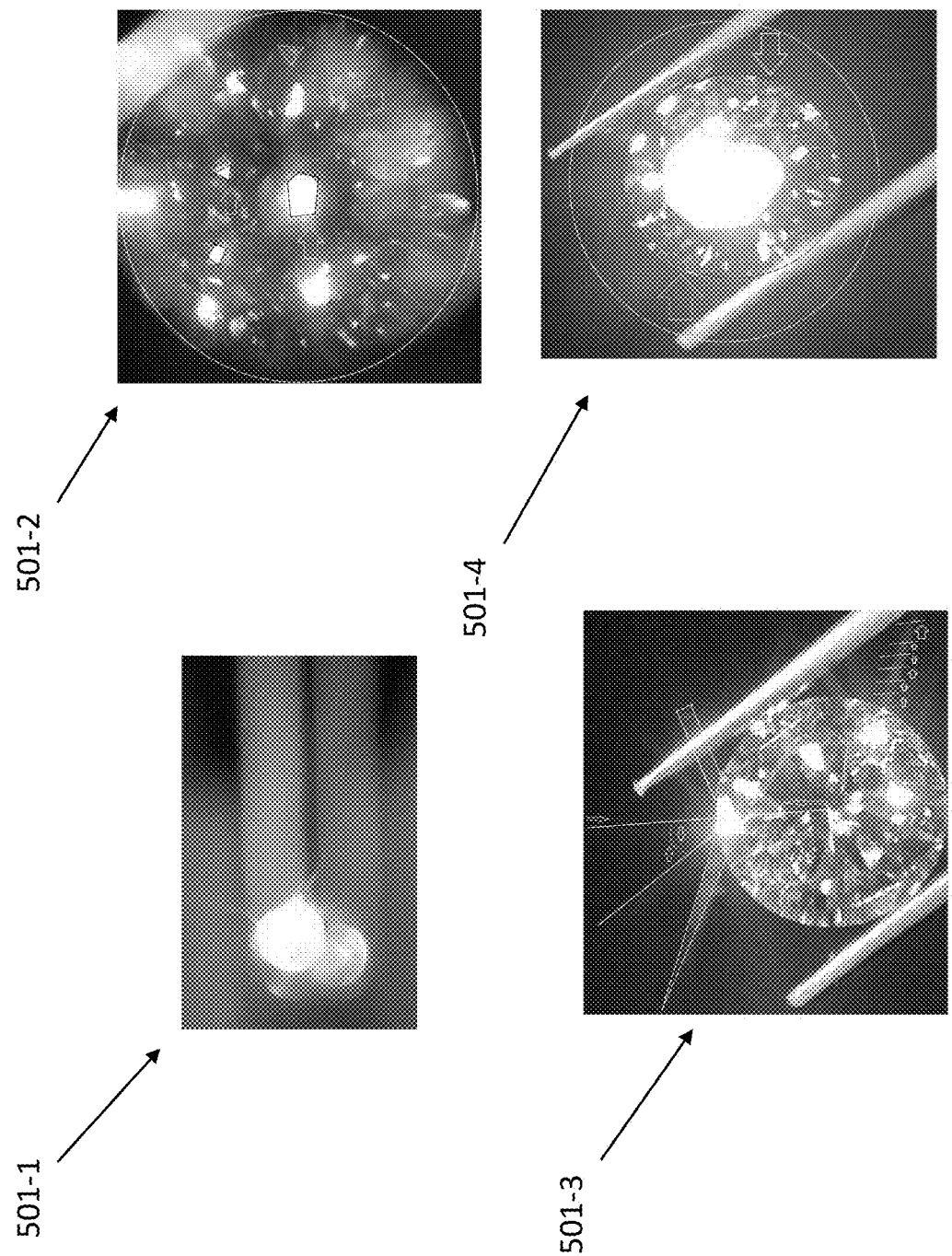
FIG. 5A is a set of images showing scintillation of gemstones.

Each training image is associated with identifying information representing the scintillation of each different gemstone at each different angle. For example, FIG. 5A is a set of images 501-1 through 501-4 showing different gemstones at different angles and having scintillation and showing annotations identifying salient features in the images corresponding to scintillation. Image 501-1 illustrates an out-of-focus image of a gemstone showing circles of light or halos, and flashes of light or scintillation. Image 501-2 illustrates an overfocused image of a gemstone showing colors inside from where white and colored flashes occur. Image 501-3 illustrates an in-focus image of a gemstone having flashes, color distribution of the flashes, and the thickness, size, and distance travelled of the flashes. Image 501-4 illustrates an approximate field or circle depicting a type of white aura around a gemstone, with arrows showing a measurable distance from the edges of the gemstone. In the example shown in FIG. 5A, in the image 501-4, the arrows show measurable distance from edges of the gemstone. The identifying information can be a numerical value measuring the scintillation of each different gemstone at each different angle. The numerical value can be a single value representing the color of the scintillation, such as "0" for black, "1" for red, "2" for orange, etc., according to a predetermined color encoding model. Alternatively, the numerical value can be an N-tuple of multiple numbers, with the multiple numbers representing the color of the scintillation. For example, a three-tuple or triplet of numbers, such as (0, 100, 255), can represent a color according to the red-green-blue (RGB) color model. In another embodiment, the identifying information can be a letter grade, such as "A", "B", etc. corresponding to the degree of scintillation.

Once the machine learning module 154 is trained to evaluate the scintillation of different gemstones at different angles, the system 100 can be activated to illuminate the test gemstone 150, as shown in FIG. 1A, and the image capturing component 120 captures at least one query image of the test gemstone 150. The trained machine learning module 154 then processes the at least one query image to obtain and output a value which objectively measures the scintillation of the test gemstone 150. For example, the output value can be a single number, a tuple of numbers, or a letter grade as described above. The output value can be a distance travelled by a flash of light from a given point on the gemstone 150, such as the center, a geometric center, a mathematical center, or an edge of the gemstone 150 to the tip or end of the light flash. Alternatively, the output value can also be the thickness or total area measured of the flash. Such output values can be relative measurements in relation to an area of the gemstone 150, such as a total area of the gemstone 150 measured in, for example, pixels per square inch.

In addition, a halo, aura, or other features of a gemstone 150 can be measured, and colors of such haloes, auras, or other features can be extracted. The union, intersection, shapes, and sizes of the haloes, auras, or other features can all be quantified, extracted, and computed. Also, a model can be obtained to derive the objective value, strength, and other measurements of the gemstones. The model can be mathematical or statistical. The model can be obtained based on the shape of the gemstone 150. For example, the model can be based on a round or marquise shape of the gemstone 150. Alternatively, the model can be based on a surface area, a face-up surface area, or other mixes of categories of features of the gemstone 150.

The trained machine learning module 154 can also assist in the cutting process of rough gemstones. By measuring the scintillation of a rough gemstone, the system 100 allows a gemstone craftsman to decide how and where to place a facet and at what angle to improve the scintillation of the rough gemstone during the cutting process. For example, by measuring the scintillation of the rough gemstone, the system 100 can determine where and how the internal structures and confluences of the atomic structures of the rough gemstone are gathering. Such internal structures and confluences bounce, refract, reflect, and dissipate incident light, causing the scintillations of the gemstone. Thus, the objective measuring of scintillations of a gemstone by the system 100, as the gemstone is being cut, can improve the scintillation to obtain a best or optimal light return and scintillation of the final cut of the gemstone.

Evaluating Color

The machine learning module 154 can also be trained to objectively measure the color of a test gemstone 150. The machine learning module 154 can also be trained to find inclusions of the test gemstone 150. In addition, the machine learning module 154 can be trained to objectively measure the milkyness of the test gemstone 150. Such milkyness can affect the color or clarity of the test gemstone 150. In addition, such milkyness can be caused by inclusions found in the test gemstone 150. Milkyness in a gemstone such as a diamond can be evaluated by analyzing any differences in the foreground or the background of the gemstone. The milkyness can also be analyzed by contrasts in colors, hues, tints, tinges, etc. of the gemstone as a whole or analyzed with regard to each facet of the gemstone. In addition, milkyness can be analyzed by the amount of blackness, whiteness, pixilation, or color that is associated with a given facet. Alternatively, the milkyness can be analyzed for the intersections of facets or the union of facets with any patterns from the foreground, from the background, or from patterns with other facets.

In one embodiment, the image capturing component 120 can control the lens 125 or the light source 160 to direct light to a different gemstone at different angles to capture a plurality of training images having different colors. Alternatively, image capturing component 120 can repeat the controlling operation of the lens 125 or the light source 160 for capturing a plurality of training images from multiple gemstones. The lens 125 or the light source 160 can be motorized, for example, with servomotors. Such motorization can be controlled using the processing unit 124. Alternatively, the gemstone holder 102 can be configured to move different gemstones by translation or by rotation, allowing the image capturing component 120 to capture a plurality of training images having different colors of gemstones. In one embodiment, the holder 102 can be motorized, for example, with servomotors under the control of the processing unit 124.

To obtain such training images, the gemstone can be placed on its side. The gemstone can also be placed in or on a shade card. Alternatively, the gemstone can be placed in a gem box. In addition, the gemstone can be placed on the gemstone holder 102 or on a jewelry item. Moreover, the gemstone can be manually held by a tweezer or in any other known way. Further, the gemstone can be placed face up or face down. In addition, the gemstone can be positioned against a master gemstone or a sample gemstone for reference. The lighting conditions of each gemstone can also be varied. Still further, multiple images of gemstones under varied focal conditions and lighting conditions can be captured. In this manner, multiple images of gemstones can be captured by the image capturing component 120 to be training images having different colors of gemstones.

Figure 5B:
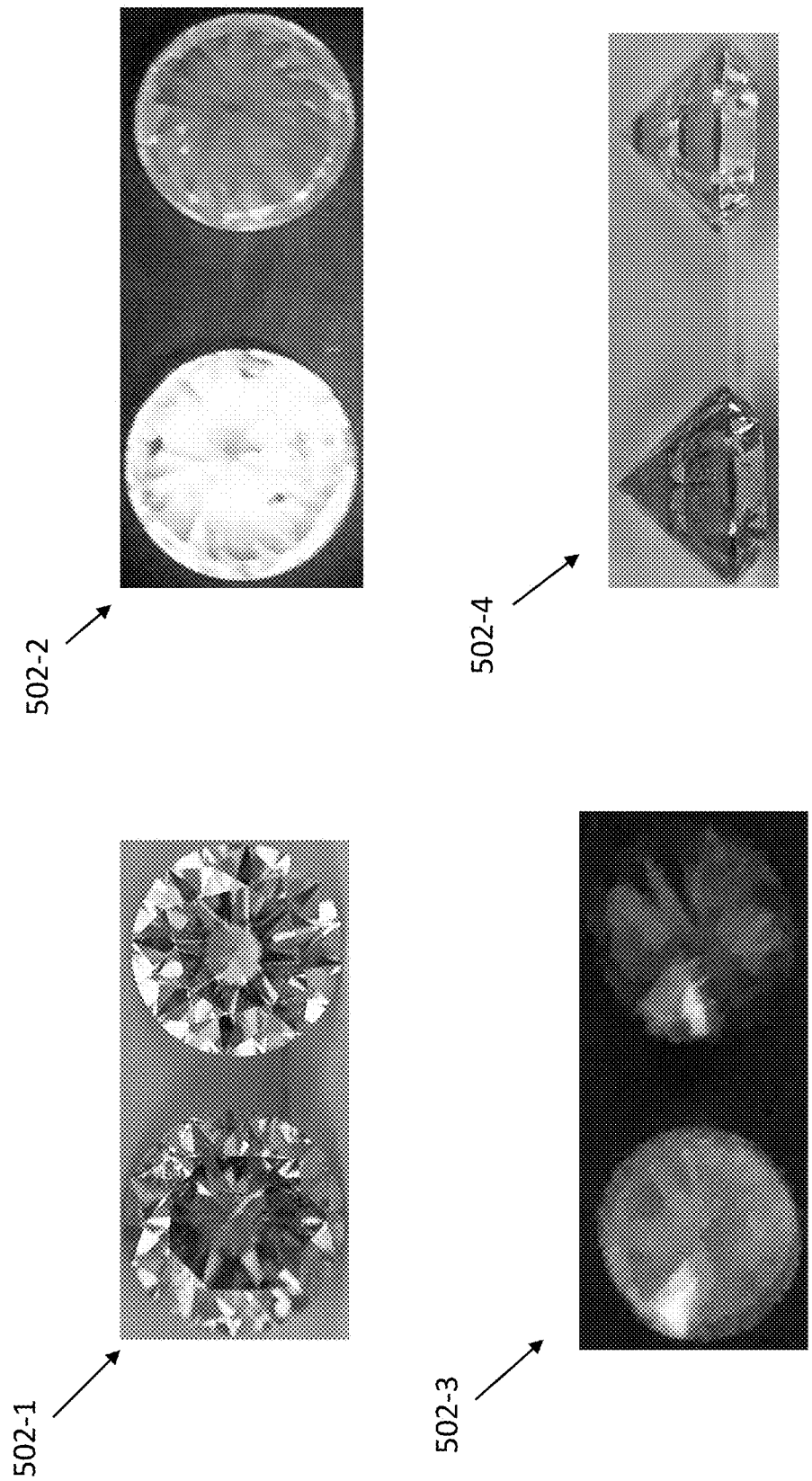
FIG. 5B is a set of images showing changes in color of gemstones.

Each training image is associated with identifying information representing the color of each different gemstone at each different angle, as well as at each different focal point, with different lighting conditions. FIG. 5B is a set of images 502-1 through 502-4 showing different gemstones at different angles and having different colors. Image 502-1 illustrates face-up views of a pair of gemstones. Image 502-2 illustrates face-up views of another pair of gemstones. Image 502-3 illustrates face-up views of a third pair of gemstones. Image 502-4 illustrates side views of a fourth pair of gemstones. For example, under fluorescent light, the color of a gemstone can change compared to illuminating the gemstone in daylight. In addition, the hue, tone, brightness, and other color representative features can have associated identifying information. Furthermore, the identifying information can specify various colors in the gemstone, such as whether the gemstone has more than one color. The identifying information can be a numerical value measuring the color of each different gemstone at each different angle. The numerical value can be a single value representing the color of the gemstone, such as "0" for black, "1" for red, "2" for orange, etc., according to a predetermined color encoding model. Alternatively, the numerical value can be an N-tuple of multiple numbers, with the multiple numbers representing the color of the gemstone. For example, a three-tuple or triplet of numbers, such as (0, 100, 255), can represent a color according to the red-green-blue (RGB) color model. Alternatively, hex code or any other known model can be used to specify numbers defining a color of a gemstone in objective and narrow ranges. Such numerical values can be used to find or match a given gemstone with other gemstones of a similar nature or color.

Once the machine learning module 154 is trained to evaluate the colors of different gemstones at different angles, the system 100 can be activated to illuminate the test gemstone 150, as shown in FIG. 1A, and the image capturing component 120 captures a query image of the test gemstone 150. The trained machine learning module 154 then processes the query image to obtain and output a value which objectively measures the color of the test gemstone 150. For example, the output value can be a single number, a tuple of numbers, or a letter grade as described above.

The series of images shown in FIG. 2B are of the same gem placed on a gemstone holder comprising a sponge within a box and taken from the "top-view" at varied focal settings. As can be appreciated, it can be difficult to extract the colors from a single image such as 210-1 due to the black/white appearing facets merging which creates other color distributions. Additionally, any exterior light reflections, refractions further create even more confusion in such a singular in-focus image. However, as can be seen from the series of varied focus images captured using the exemplary lighting and imaging methods, serves to remove the confusions present within a single image and provides an effective color extraction method.

Furthermore the imaging and NN-based analysis techniques enable the system to extract even more feature data that gives more detail about the gem. For instance, from the varied-focus image set the processing unit 124 can be configured to determine the "depth" of a gem (i.e., the distance from the culet to the flat top surface) or the distance between its sections (e.g., the crown, the girdle, the girdle thickness, the culet, and areas there-between), as the light highlights each section of the gem in a planar or other level and even to a pixel level, creating new patterns that only the trained NN can detect. As can be seen in the series of images of FIG. 2B, the black colored appearance of the table in the center of the gem goes from appearing relatively large in image 210-1 to small in image 210-4 until it is not visibly present in the image 210-6, as this is caused by the internal reflections of the light in the gem as it hits these various levels in the gem. Accordingly, by using a physical/optical/visual or other measuring device, the distance traveled while taking an image, the processing unit can be configured to determine the measurements of the depth of the gemstone as well as the total architecture of the stone. Alternatively, a combination or stitched consolidated image based on a best features gathered by the system 100 can be created to make a single image of one or more gemstones, if needed.

Evaluating Patterns

The machine learning module 154 can also be trained to objectively measure patterns of a test gemstone 150. The patterns of a gemstone can be facet patterns, such as a heart, an arrow, a petal, or other known facet patterns of a gemstone. Facet patterns, as well as polishing, symmetry, rough gem formation, and other factors can create various other optical patterns seen under various focal settings under various light and distance conditions. Such other optical patterns appear as light reflected, refracted, or returned as halos, petals, and colors from some or all of such conditions. Accordingly, the neural network can be trained to measure the pattern of a test gemstone based on the light patterns that are shown inside the gemstone in images captured under varying imaging and lighting conditions. Alternatively, the measured pattern can be seen around the gemstone. Furthermore, the measured pattern can be created by the test gemstone 150 to be emanating from the inside of the gemstone 150. In addition, the measured pattern can emanate from outside the test gemstone 150. In one embodiment, the image capturing component 120 can control the lens 125 or the light source 160 to direct light to a different gemstone at different angles to capture a plurality of training images having different patterns. The lens 125 or the light source 160 can be motorized, for example, with servomotors. Such motorization can be controlled using the processing unit 124. Alternatively, the gemstone holder 102 can be configured to move different gemstones by translation or by rotation, allowing the image capturing component 120 to capture a plurality of training images having different patterns. In one embodiment, the holder 102 can be motorized, for example, with servomotors under the control of the processing unit 124. Alternatively, the movement of the test gemstone 150 relative to the image capturing component 120 can be performed manually.

Figure 5C:
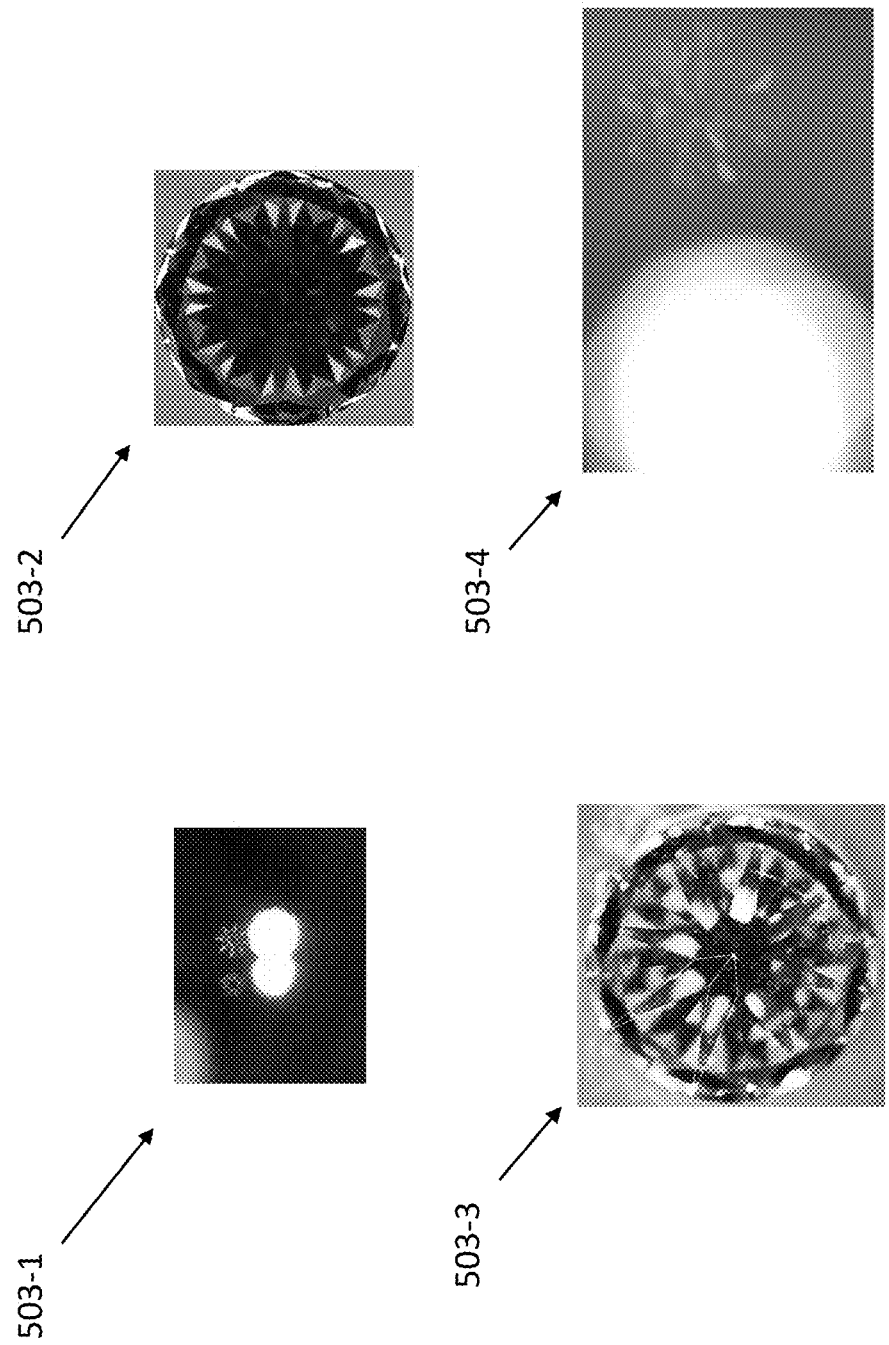
FIGS. 5C-5D are sets of images showing patterns of gemstones, including patterns in, from, on, or around the gemstones.
Figure 5D:
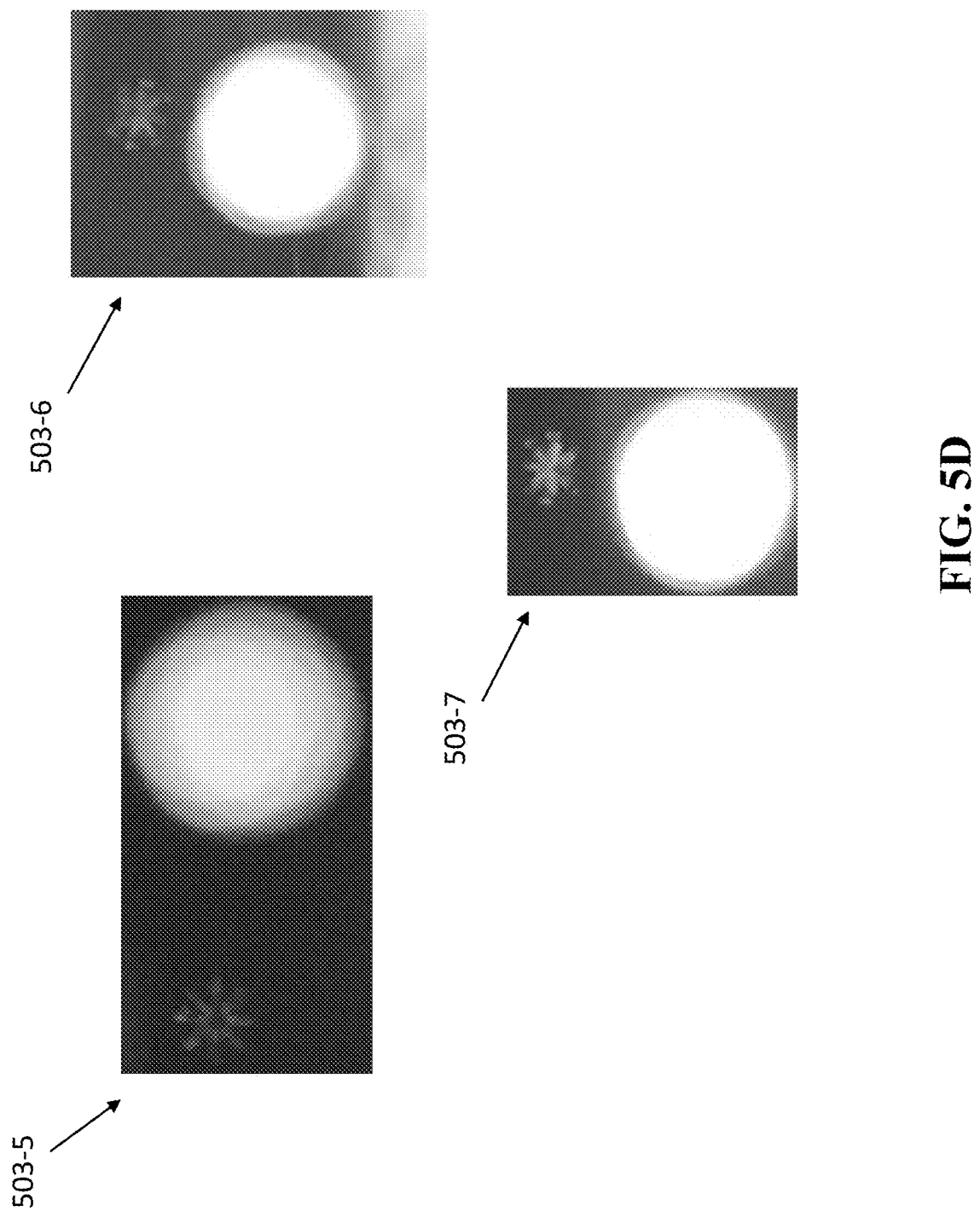

Each training image can be associated with identifying information representing the pattern of each different gemstone at each different angle. FIGS. 5C-5D are sets of images 503-1 through 503-7 showing different gemstones at different angles with patterns. Image 503-1 illustrates a top view of a gemstones with an arrow pattern. Image 503-2 illustrates a top view of a gemstone with a hearts pattern. Image 503-3 illustrates a bottom view of a gemstone with a hearts and arrow pattern. Image 503-4 illustrates a top view of a gemstone with an internal facets pattern. Images 503-1 and 503-4 can be considered like a mirage, with the actual gemstones, such as diamonds, being the two bright spots in the images. The patterns or illusion is formed in mid-air like a hologram or a 3D image. Such patterns in the images can be processed to extract information about the gemstones in the images. Image 503-5 illustrates a top view of another gemstone with an internal facets pattern. Image 503-6 illustrates a bottom view of a pavilion of a gemstone with a facets pattern. Image 503-7 illustrates a bottom view of a pavilion of another gemstone with a facet pattern. The images 503-5, 503-6, and 503-7 also can be considered like a mirage, with the actual gemstones, such as diamonds, being the bright spots in the images. The identifying information can be a numerical value representing the pattern of each different gemstone at each different angle. For example, a heart can be represented by a "1", an arrow can be represented by a "2", a petal can be represented by a "3", etc. Alternatively, the identifying information can be a letter value representing the pattern of each different gemstone at each different angle. For example, a heart can be represented by an "A", an arrow can be represented by a "B", a petal can be represented by a "C", etc. In another alternative embodiment, the letter values can be alphanumeric strings, such as "CM1", representing a first crown and main pattern, while "CS1" represents a first crown and second pattern. In a further alternative embodiment, the alphanumeric strings can designate (Area+Name+ (Number or Name)) which equals the number of facets. Alternatively, alphanumeric strings can be (facetA #1+facetB #1) which is the pattern, while (facetA #1+facetB #1)*N represents a bigger pattern.

The designations can also indicate the intersections or union of patterns. In some cases, the designation can represent a negative result. For example, the designation can indicate a bad pattern in the gemstone, such as from a bad cutting of the gemstone. In another example, the designation can indicate a lack of a pattern or a lack of a continuous pattern formation.

The identifying information can be based on the cut type, such as round or emerald, as well as based on the number of facets and the number of possible patterns. In addition, the information regarding facets can include the total number of facets based on their type, shape, and placement. The identifying information can also be based on the imaging angle, as well as based on the part of the gemstone which is being imaged, such as the crown, girdle, or pavilion area. During the imaging, if it is determined that there are extra facets, the identifying information about a gemstone includes a notification or label indicating extra facets. In addition, a user can be notified of such extra facets in an output message or alert.

Numerical values identifying and representing patterns can be due to a characteristic of an image of the gemstone. For example, the image can be over-focused, in-focus, under-focused, or out-of-focus. The numerical values can also be due to any halos, auras, petals, facets, and their light responses from the illuminated gemstone. The facet can be from a reflected facet, an internally reflected facet, a girdle, a girdle facet, a culet, a table, or a pavilion. Each type of facet or gemstone feature gives a corresponding light response, or causes a pattern when hit by incident light.

In addition, a combination of one or more halos, auras, facets, petals, etc. as well as their union or intersection can create various patterns. For example, a reflection of a crown facet as an arrow head can be combined by a pavilion facet touching the reflection can result in an arrow pattern. Alternatively, a bottom view of such a combination can give a facet reflection which shows a heart pattern. In one example, a total of eight top views of arrows and eight bottom views of hearts can create a pattern known as a heart and arrow pattern, which is caused by the symmetrical cutting and placement of each facet on a crown, pavilion, table, culet, and girdle.

Once the machine learning module 154 is trained to evaluate the pattern of different gemstones at different angles, the system 100 can be activated to illuminate the test gemstone 150, as shown in FIG. 1A, and the image capturing component 120 captures a query image of the test gemstone 150. The trained machine learning module 154 then processes the query image to obtain and output a value which objectively measures the pattern of the test gemstone 150. For example, the output value can be a single number or a letter grade as described above.

Evaluating Dimensions

The machine learning module 154 can also be trained to objectively measure the dimensions and angles of a test gemstone 150. The dimensions of a gemstone can be a maximum length, width, and height of the gemstone. The angles can be formed between line segments associated with dimensions and features of the test gemstone 150. For example, an angle can be formed between a table line and another line segment, forming a crown angle from a side view. In another example, the angles can be formed by a pavilion and line segments from where the pavilion touches the girdle. Such measured dimensions and angles can be used by the machine learning module 154 to determine a volume of the test gemstone 150. In one embodiment, the image capturing component 120 can control the lens 125 to capture a plurality of images having different focal settings. The lens 125 or the light source 160 can be motorized, for example, with servomotors. Such motorization can be controlled using the processing unit 124. Alternatively, the gemstone holder 102 can be configured to move different gemstones by translation or by rotation, allowing the image capturing component 120 to capture a plurality of training images having different dimensions. In one embodiment, the holder 102 can be motorized, for example, with servomotors under the control of the processing unit 124.

Each training image associated with identifying information representing the dimensions and lines of each different gemstone at each different angle. The identifying information can be at least one numerical value representing a specific dimension of each different gemstone at each different angle. Alternatively, the identifying information can be a triplet of numerical values representing, in order, the maximum length, maximum width, and maximum height of each different gemstone. Still further, the identifying information can be an N-tuple of N numerical values representing, in order, the width of the table of the gemstone, the height of the crown of the gemstone, the height or thickness of the girdle of the gemstone, the height of the pavilion of the gemstone, the width of a culet of the gemstone, the facet structure of the gemstone, the architecture of the gemstone, etc. In addition, the identifying information can specify angles between lines of a given gemstone.

Once the machine learning module 154 is trained to evaluate the dimensions of different gemstones at different angles, the system 100 can be activated to illuminate the test gemstone 150, as shown in FIG. 1A, and the image capturing component 120 captures a query image of the test gemstone 150. The trained machine learning module 154 then processes the query image to obtain and output at least one value which objectively measures the dimensions of the test gemstone 150. For example, the output value can be a single number or an N-tuple of numbers, as described above. Alternatively, a user can input values associated with the test gemstone 150, or associated with a different gemstone against which the test gemstone 150 can be analyzed after the different gemstone is analyzed.

Evaluating Symmetry

The machine learning module 154 can also be trained to objectively measure a symmetry of a test gemstone 150. In one embodiment, the image capturing component 120 can control the lens 125 or the light source 160 to direct light to a different gemstone at different angles to capture a plurality of training images having different symmetries. The lens 125 or the light source 160 can be motorized, for example, with servomotors. Such motorization can be controlled using the processing unit 124. Alternatively, the gemstone holder 102 can be configured to move different gemstones by translation or by rotation, allowing the image capturing component 120 to capture a plurality of training images having different symmetries. In one embodiment, the holder 102 can be motorized, for example, with servomotors under the control of the processing unit 124.

Each training image associated with identifying information representing the symmetry of each different gemstone at each different angle. The identifying information can be a numerical value representing the symmetry of each different gemstone at each different angle, such as a "1" for a gemstone having symmetry, and a "0" for a gemstone having no symmetry. In addition, the identifying information involving symmetry can be a range of numerical values. For example, the range can be between 0 and 1. The light return or formations can be graded based on the clarity or intensity of the light return, as well as the exactness or lack of exactness of the formed and imaged multiple light returns, such as halos, auras, light petals, etc., and their patterns and formations. In addition, faceting accuracy information or exactness can be input into the dataset to illustrate how the light responds to faceting, symmetry, or the cutting process.

In another example, the numerical values can be greater than 1 or less than 0. In addition, –ve and +ve numbers can be used which enable symmetry to be better or lower than a range, such as specifying better ways of cutting the gemstone. For example, older cuts can be downgraded or can be shown as +ve improvements over given older symmetries or grades. In additional alternative embodiments, the numerical values can be decimals, such as 79.95 or 0.7995. Such decimal values can specify many such proportions, combinations, and possibilities for the length, base, and height of a gemstone. Also, ratios of length to base to height can be specified by decimal values. Further, the numerical values can specify the table, crown, girdle, pavilion, and faceting, as well as percentages of numerical values, angles, placements, etc. Alternatively, a letter grade can be "T" for "TRUE" for gemstone having symmetry, and "F" for "FALSE" for a gemstone with no symmetry. In addition, the identifying information can be a word or message, such as "TRUE" for a gemstone with symmetry, and "FALSE" for a gemstone without symmetry. Other words which can be used are "IDEAL", "EXCELLENT", "VERY GOOD", "GOOD", "POOR", "FAIR", etc. Such words or messages can be associated with a numerical value to describe a quantitative value of the symmetry.

Once the machine learning module 154 is trained to evaluate the symmetry of different gemstones at different angles and in different lighting conditions using the different light and varied foci-enabled light responses and patterns, the system 100 can be activated to illuminate the test gemstone 150, as shown in FIG. 1A, and the image capturing component 120 captures a query image of the test gemstone 150. The trained machine learning module 154 then processes the query image to obtain and output a value which objectively measures the symmetry of the test gemstone 150. For example, the output value can be a single number or a letter grade as described above.

Evaluating Cut Grade

The machine learning module 154 can also be trained to objectively measure a cut grade of a test gemstone 150. The cut grade can be nominal. Alternatively, the cut grade can be a final cut grade which can be a combination of one or all of the other grades associated with a gemstone. Such other grades can include a polish grade, a finish grade, a symmetry grade, a light return grade, dimensions, and proportions based on both physical computations or optical properties of the test gemstone 150. The cut grade can be a weighted average of other grades. Alternatively, the cut grade can be determined from a predetermined formula or method for extracting the cut grade based on a user model or a predefined grading model. In one embodiment, the image capturing component 120 can control the lens 125 or the light source 160 to direct light to a different gemstone at different angles to capture a plurality of training images having different cut grades. The lens 125 or the light source 160 can be motorized, for example, with servomotors. Such motorization can be controlled using the processing unit 124. Alternatively, the gemstone holder 102 can be configured to move different gemstones by translation or by rotation, allowing the image capturing component 120 to capture a plurality of training images having different cut grades. In one embodiment, the holder 102 can be motorized, for example, with servomotors under the control of the processing unit 124.

Each training image associated with identifying information representing the cut grade of each different gemstone at each different angle. The identifying information can be a numerical value representing the cut grade of each different gemstone at each different angle. Alternatively, the identifying information can be a letter grade representing the cut grade of each different gemstone at each different angle.

Once the machine learning module 154 is trained to evaluate the cut grade of different gemstones at different angles, the system 100 can be activated to illuminate the test gemstone 150, as shown in FIG. 1A, and the image capturing component 120 captures a query image of the test gemstone 150. The trained machine learning module 154 then processes the query image to obtain and output a value which objectively measures the cut grade of the test gemstone 150. For example, the output value can be a single number or a letter grade as described above. The final cut grade can be derived from one or more other grades, such as polish, symmetry, light response, performance, scintillation, brightness, etc.

Evaluating Clarity

The machine learning module 154 can also be trained to objectively measure clarity of a test gemstone 150. In one embodiment, the image capturing component 120 can control the lens 125 or the light source 160 to direct light to a different gemstone at different angles to capture a plurality of training images having different clarities. The lens 125 or the light source 160 can be motorized, for example, with servomotors. Such motorization can be controlled using the processing unit 124. Alternatively, the gemstone holder 102 can be configured to move different gemstones by translation or by rotation, allowing the image capturing component 120 to capture a plurality of training images having different clarities. In one embodiment, the holder 102 can be motorized, for example, with servomotors under the control of the processing unit 124.

Each training image associated with identifying information representing the clarity of each different gemstone at each different angle. The identifying information can be a numerical value representing the clarity of each different gemstone at each different angle. The numerical value can be a weighted average of clarity values based on the placement of the gemstone, color, size, shape, translucency, opacity, light reflectivity, type, nearness to an inclusion, or any other feature of the gemstone. In addition, the clarity values can be based on the degree of light incident on a feature or an inclusion. Further, the clarity values can be based on the degree of light bending around a feature or an inclusion. Also, the clarity values can be based on the degree of light passing through a feature or an inclusion. Alternatively, the clarity values can be based on the degree of light leaking out of the various portions of the gemstone. Such leaked light can be reflected, can be refracted, or can illuminate various portions of the gemstone. In addition, the light can add or remove shadows and reflections, or can cause blind spots which can hide parts of the gemstone, including features or inclusions of the gemstone.

The clarity values can be affected by light at various distances from the features or inclusions, or as the focus changes. In addition, the clarity values can be affected by lighting conditions on the gemstone, and highlighted features or inclusions. Using such clarity values, a 3D model or mapping can be created to determine a best distance or focal setting and a best lighting condition or highlighting of the gemstone for measuring the clarity of the gemstone. In an alternative embodiment, the clarity values can be based on a user model. The user model can be a predefined model configured to determine a clarity value. Alternatively, the identifying information can be a letter grade representing the clarity.

Once the machine learning module 154 is trained to evaluate the clarity of different gemstones at different angles, the system 100 can be activated to illuminate the test gemstone 150, as shown in FIG. 1A, and the image capturing component 120 captures a query image of the test gemstone 150. The trained machine learning module 154 then processes the query image to obtain and output a value which objectively measures the clarity of the test gemstone 150. For example, the output value can be a single number or a letter grade as described above.

Evaluating Light Return

The machine learning module 154 can also be trained to objectively measure the light return of a test gemstone 150. Such light return can be associated with one or more patterns, halos, or other light effects. In one embodiment, the image capturing component 120 can control the lens 125 or the light source 160 to direct light to a different gemstone at different angles to capture a plurality of training images having different light returns. The lens 125 or the light source 160 can be motorized, for example, with servomotors. Such motorization can be controlled using the processing unit 124. Alternatively, the gemstone holder 102 can be configured to move different gemstones by translation or by rotation, allowing the image capturing component 120 to capture a plurality of training images having different light returns. In one embodiment, the holder 102 can be motorized, for example, with servomotors under the control of the processing unit 124.

Each training image associated with identifying information representing the light return of each different gemstone at each different angle, as well as for each different part of the gemstone. The light return can also be a total light return or a partial light return for each different gemstone. A final value of the light return can be a weighted average of all of the light returns from the various parts of the gemstone. Alternatively, the final value can be based on a user defined formula or a predefined model. The identifying information can be a numerical value representing the light return of each different gemstone or parts of a gemstone at each different angle. For example, the numerical value can be "100" for absolute light return, and "0" for no light return.

Once the machine learning module 154 is trained to evaluate the light return of different gemstones at different angles, the system 100 can be activated to illuminate the test gemstone 150, as shown in FIG. 1A, and the image capturing component 120 captures a query image of the test gemstone 150. The trained machine learning module 154 then processes the query image to obtain and output a value which objectively measures the light return of the test gemstone 150. For example, the output value can be a single number as described above.

Evaluating Finishing

The machine learning module 154 can also be trained to objectively measure the finishing of a test gemstone 150. In one embodiment, the image capturing component 120 can control the lens 125 or the light source 160 to direct light to a different gemstone at different angles to capture a plurality of training images having different degrees of finishing. The lens 125 or the light source 160 can be motorized, for example, with servomotors. Such motorization can be controlled using the processing unit 124. Alternatively, the gemstone holder 102 can be configured to move different gemstones by translation or by rotation, allowing the image capturing component 120 to capture a plurality of training images having different degrees of finishing. In one embodiment, the holder 102 can be motorized, for example, with servomotors under the control of the processing unit 124.

Each training image associated with identifying information representing the finishing of each different gemstone at each different angle. The identifying information can be a numerical value representing the finishing of each different gemstone at each different angle. For example, a numerical value of "100" can be assigned to a gemstone with an absolute finishing, while a "0" can be assigned to a gemstone with no finishing.

Once the machine learning module 154 is trained to evaluate the finishing of different gemstones at different angles, the system 100 can be activated to illuminate the test gemstone 150, as shown in FIG. 1A, and the image capturing component 120 captures a query image of the test gemstone 150. The trained machine learning module 154 then processes the query image to obtain and output a value which objectively measures the finishing of the test gemstone 150. For example, the output value can be a single number or a letter grade as described above.

Evaluating Treatment

The machine learning module 154 can also be trained to objectively measure a treatment of a test gemstone 150. In one embodiment, the image capturing component 120 can control the lens 125 or the light source 160 to direct light to a different gemstone at different angles to capture a plurality of training images having different treatments, such as fracture filling, hole filling, laser drilling of holes, annealing of gems, oil treatments, or other known treatments. Such treatments can be imaged and taught to the machine learning module 154. The lens 125 or the light source 160 can be motorized, for example, with servomotors. Such motorization can be controlled using the processing unit 124. Alternatively, the gemstone holder 102 can be configured to move different gemstones by translation or by rotation, allowing the image capturing component 120 to capture a plurality of training images having different treatments. In one embodiment, the holder 102 can be motorized, for example, with servomotors under the control of the processing unit 124.

Each training image associated with identifying information representing the treatment of each different gemstone at each different angle. The identifying information can be a numerical value representing the treatment of each different gemstone at each different angle, such as "100" for a clean gemstone, and "0" for a completely opaque gemstone. Alternatively, a letter grade can be use, such as an "A" for a clean gemstone, or an "F" for a completely opaque gemstone. Still further, the letter grade can be "F" for "FALSE" for a clean gemstone having no treatment, and a "T" for "TRUE" for a completely opaque gemstone having a treatment.

Once the machine learning module 154 is trained to evaluate the treatment of different gemstones at different angles, the system 100 can be activated to illuminate the test gemstone 150, as shown in FIG. 1A, and the image capturing component 120 captures a query image of the test gemstone 150. The trained machine learning module 154 then processes the query image to obtain and output a value which objectively measures the treatment of the test gemstone 150. For example, the output value can be a single number or a letter grade as described above.

Evaluating Facets

The machine learning module 154 can also be trained to objectively measure facets of a test gemstone 150. In one embodiment, the image capturing component 120 can control the lens 125 or the light source 160 to direct light to a different gemstone at different angles to capture a plurality of training images having different facets. The lens 125 or the light source 160 can be motorized, for example, with servomotors. Such motorization can be controlled using the processing unit 124. Alternatively, the gemstone holder 102 can be configured to move different gemstones by translation or by rotation, allowing the image capturing component 120 to capture a plurality of training images having different facets. In one embodiment, the holder 102 can be motorized, for example, with servomotors under the control of the processing unit 124.

Each training image associated with identifying information representing the facet of each different gemstone at each different angle. The identifying information can be a numerical value representing the facet of each different gemstone at each different angle. For example, the numerical value can be "2" for a gemstone with two facets, can be "3" for a gemstone with three facets, etc. Alternatively, the numerical values can be based on the placement and type of facet, as well as the completeness of a facet structure.

Once the machine learning module 154 is trained to evaluate the facets of different gemstones at different angles, the system 100 can be activated to illuminate the test gemstone 150, as shown in FIG. 1A, and the image capturing component 120 captures a query image of the test gemstone 150. The trained machine learning module 154 then processes the query image to obtain and output a value which objectively measures the facets of the test gemstone 150. For example, the output value can be a single number as described above.

Evaluating Edges

The machine learning module 154 can also be trained to objectively measure edges of a test gemstone 150. In one embodiment, the image capturing component 120 can control the lens 125 or the light source 160 to direct light to a different gemstone at different angles to capture a plurality of training images having different edges. The lens 125 or the light source 160 can be motorized, for example, with servomotors. Such motorization can be controlled using the processing unit 124. Alternatively, the gemstone holder 102 can be configured to move different gemstones by translation or by rotation, allowing the image capturing component 120 to capture a plurality of training images having different edges. In one embodiment, the holder 102 can be motorized, for example, with servomotors under the control of the processing unit 124.

Each training image associated with identifying information representing the edges of each different gemstone at each different angle. The identifying information can be numerical values representing the edges of each different gemstone at each different angle. For example, the numerical value can be "1" for a gemstone with one edge, can be "2" for a gemstone with two edges, can be "3" for a gemstone with three edges, etc. Alternatively, the numerical value can specify a same type of edge repeated N times.

Once the machine learning module 154 is trained to evaluate the edges of different gemstones at different angles, the system 100 can be activated to illuminate the test gemstone 150, as shown in FIG. 1A, and the image capturing component 120 captures a query image of the test gemstone 150. The trained machine learning module 154 then processes the query image to obtain and output a value which objectively measures the edges of the test gemstone 150. For example, the output value can be a single number as described above.

Evaluating Caratage

The machine learning module 154 can also be trained to objectively measure the caratage or mass of a test gemstone 150. In one embodiment, the holder 102 can incorporate a weighing device, such as a scale, for measuring the caratage of the test gemstone 150. The system 100 then captures a plurality of training values as weights or masses of different gemstones.

In another embodiment, the caratage can be determined from the volume or the specific density of the test gemstone. In addition, the machine learning module 154 can be trained to objectively determine the type of gemstone under test. At least one image is to be obtained, such as a top view, a bottom view, a side view, and views from different angles. The gathered information can include the various angles of the test gemstone 150, the length, base, and height of the test gemstone 150, and faceting of the test gemstone 150. Using the gathered information, the machine learning module 154 can formulate the volume, dimensions, angles, and weight of the test gemstone 150 from multiple images. Accordingly, the image capturing component 120 can control the lens 125 or the light source 160 to direct light to a different gemstone at different angles to capture a plurality of training images having different volumes representing different caratages. The lens 125 or the light source 160 can be motorized, for example, with servomotors. Such motorization can be controlled using the processing unit 124. Alternatively, the gemstone holder 102 can be configured to move different gemstones by translation or by rotation, allowing the image capturing component 120 to capture a plurality of training images having different volumes representing different caratages. The images can be taken against an object of known size and dimension. Alternatively, the user can input the known size or dimension of the object. Using the input size and dimension, the system 100 can extract the actual size and dimension using a predefined model or formula, from which an actual weight of the gemstone can be determined. In one embodiment, the holder 102 can be motorized, for example, with servomotors under the control of the processing unit 124.

Each training image associated with identifying information representing the caratage of each different gemstone at each different angle. The identifying information can be a numerical value representing the caratage of each different gemstone. For example, the numerical value can be "2" for a two carat gemstone, and "14" for a fourteen carat gemstone.

Once the machine learning module 154 is trained to evaluate the caratage of different gemstones with different masses or with different volumes at different angles, the system 100 can be activated to weigh or illuminate the test gemstone 150, as shown in FIG. 1A, and the image capturing component 120 captures a query image of the test gemstone 150. The trained machine learning module 154 then processes the measured weight or the query image to obtain and output a value which objectively measures the caratage of the test gemstone 150. For example, the output value can be a single number as described above.

Differentiating Natural Gemstones from Fabricated Gemstones

The machine learning module 154 can also be trained to objectively evaluate a test gemstone 150 as to whether the test gemstone 150 is a natural gemstone or a fabricated gemstone, such as a gemstone created using CVD, HPHT, or other known fabrication techniques. In one embodiment, the image capturing component 120 can control the lens 125 or the light source 160 to direct light to a different gemstone at different angles and at different polarizations, or with zero polarization, in the form of halos, auras, etc., to capture a plurality of training images having various parameters, such as the scintillation, the color, the pattern, the pattern of light return in the form of halos, auras, etc., the dimensions, the symmetry, the cut grade, the clarity, the light return, the pattern of the light return in the form of halos, auras, etc., the finishing, the treatment, the facets, the edges, the caratage, etc. of the gemstone. In one embodiment, shown in FIG. 2D, two round-shaped diamonds have images 230-1 through 230-3 captured with different polarizations. Image 230-1 illustrates a natural diamond on the left, while a CVD, lab created diamond is illustrated on the right, and both diamonds are in-focus. Image 230-2 shows such diamonds in an unfocused state and without polarization, while image 230-3 shows such diamonds in the unfocused state and with polarization. The formation of haloes, auras, etc. and pixelization of the light from the gemstones can be extracted as light patterns and light colors allow the neural network 156 can be trained to distinguish the natural gemstone from the man-made gemstone. Light colors, such as the tints of blue or grey, depend on the type of lab-created gemstone or treatment. Halos of tints appear in the image or in the patterns.

Figure 2E:
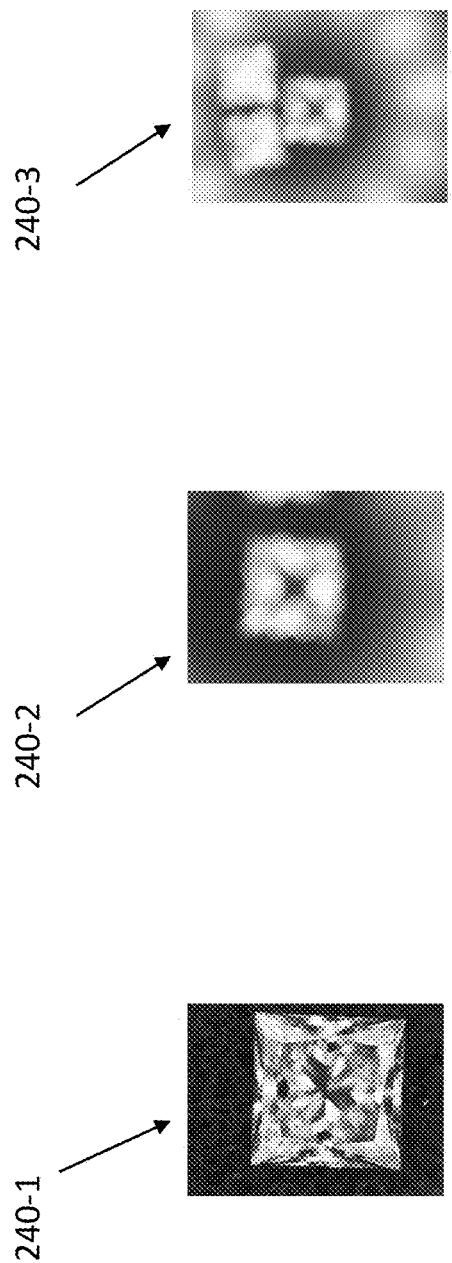
FIG. 2E is another set of images of a natural gemstone and a man-made gemstone captured by the gemstone imaging and evaluation device.
Figure 2G:
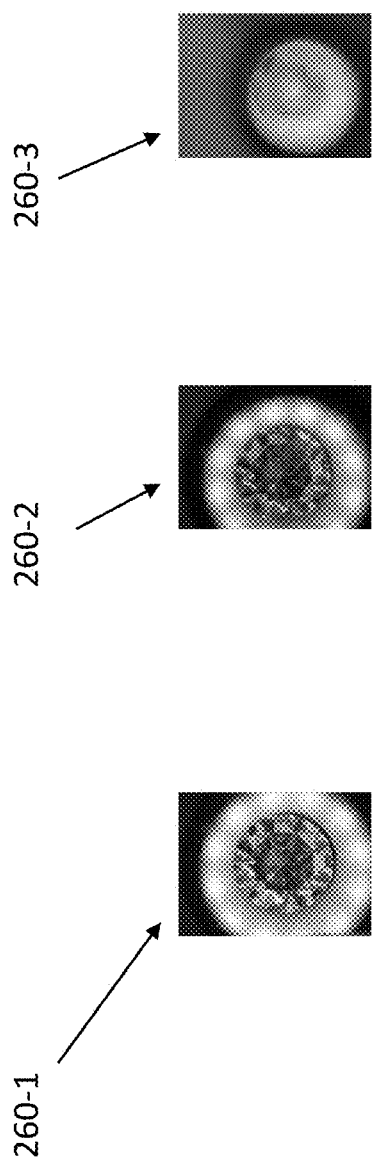
FIG. 2G is a set of images of a gemstone captured by the gemstone imaging and evaluation device with the gemstone illuminated by a laser and at different focal points.

In another embodiment, shown in FIG. 2E, images of gemstones can be obtained at different focal settings to distinguish a natural gemstone from a man-made gemstone. Images 240-1 through 240-3 illustrate princess cut diamonds. Image 240-1 is an in-focus image of a man-made CVD diamond, while image 240-2 is an unfocused image of the man-made square princess CVD diamond. In the unfocused image 240-2, a squarish black center is visible, with a light return formation created under the out-of-focus imaging. Image 240-3 is an unfocused image of three princess cut diamonds. The bottom unfocused diamond has the squarish black center, while the top two unfocused diamonds lacks the squarish black center, indicating that the top two diamonds are natural diamonds. Using such unfocused images 240-2, 240-3 with associated identification of each diamond as being natural or man-made, the neural network 156 can be trained to recognize and distinguish the natural gemstones from the man-made gemstones. In the example of images in FIG. 2E, the trained neural network 156 can be trained to recognize the presence of such squarish and black center regions in the images 240-2, 240-3. Thus, the trained neural network 156 can determine that the portions of such images 240-2, 240-3 with squarish and black centers are associated with man-made diamonds, while such portions of the image 240-3 lacking such squarish and black centers are associated with natural diamonds. Other patterns can also be found in the images, such as the placement of the halos, auras, and patterns of the halos and auras, the formation of halos and auras, the patterns of formation of the halos and auras, the color absorption of the surrounding light and surrounding colors, pixilations, the colors of such halos and pixilations, and patterns of the light return. In particular, the patterns formed in man-made gemstones compared to patterns formed by natural gemstones are different and vary, and can be identified by the trained neural network 156.

The lens 125 or the light source 160 can be motorized, for example, with servomotors. Such motorization can be controlled using the processing unit 124. Alternatively, the gemstone holder 102 can be configured to move different gemstones by translation or by rotation, allowing the image capturing component 120 to capture a plurality of training images having the various parameters. In one embodiment, the holder 102 can be motorized, for example, with servomotors under the control of the processing unit 124.

Each training image associated with identifying information representing the different parameters of each different gemstone at each different angle. The identifying information can be a numerical value representing whether each different gemstone having the various parameters is a natural gemstone or a fabricated gemstone. For example, the numerical value can be "1" for a natural gemstone, and "0" for a fabricated gemstone. In addition, a numerical value of "2" can indicate a high probability with a need for further checking. Alternatively, the identifying information can be a letter grade such as "A" for a natural gemstone and "B" for fabricated gemstone. Still further, the identifying information can be "T" for "TRUE" for a natural gemstone, and "F" for "FALSE" for a fabricated gemstone. In addition, the identifying information can be a word or message, such as "TRUE" for a natural gemstone, and "FALSE" for a fabricated gemstone. The identifying information can also include the word "SUSPECT" for a determination of a high probability of the test gemstone 150 being a natural gemstone, but not being sure about the determination.

Once the machine learning module 154 is trained to evaluate the various parameters of different gemstones at different angles, the system 100 can be activated to illuminate the test gemstone 150, as shown in FIG. 1A, and the image capturing component 120 captures a query image of the test gemstone 150. The trained machine learning module 154 then processes the query image to obtain and output a value which objectively measures the various parameters of the test gemstone 150, and which indicates whether the test gemstone 150 is a natural gemstone or a fabricated gemstone. For example, the output value can be a single number, a letter grade, or an indicative word such as "TRUE" or "FALSE", as described above.

Evaluating Imaging Parameters

The machine learning module 154 can also be trained to objectively measure imaging parameters of the system 100 when evaluating a test gemstone 150. For example, once trained, the machine learning module 154 can objectively measure a light parameter, objectively measure a camera parameter such as the focus of the image capturing component 120, or the focus level of any identified parameter, object, or information, or objectively measure a relative position of the light source 160, the image capturing component 120, and the test gemstone 150. For example, gemstone can overall be in focus, but a facet, a part of the gemstone, or an inclusion can be out of focus, or vice versa. The machine learning module 154 can be trained as to how much the gemstone or a portion thereof is in or out of focus. In one embodiment, the image capturing component 120 can control the lens 125 or the light source 160 to direct light to a different gemstone at different angles to capture a plurality of training images having different imaging parameters. The lens 125 or the light source 160 can be motorized, for example, with servomotors. Such motorization can be controlled using the processing unit 124. Alternatively, the gemstone holder 102 can be configured to move different gemstones by translation or by rotation, allowing the image capturing component 120 to capture a plurality of training images having different imaging parameters. In one embodiment, the holder 102 can be motorized, for example, with servomotors under the control of the processing unit 124.

Each training image associated with identifying information representing the imaging parameters of each different gemstone at each different angle. The identifying information can be a numerical value representing the imaging parameters of each different gemstone at each different angle. For example, the camera parameter can be a numerical measure of the focal setting of the image capturing component 120.

Once the machine learning module 154 is trained to evaluate the imaging parameters of different gemstones at different angles, the system 100 can be activated to illuminate the test gemstone 150, as shown in FIG. 1A, and the image capturing component 120 captures a query image of the test gemstone 150. The trained machine learning module 154 then processes the query image to obtain and output a value which objectively measures the imaging parameters of the system 100 evaluating the test gemstone 150. For example, the output value can be a single number or a letter grade as described above.

Bifurcating a Gemstone from Gemstone Holders and Other Gemstones

The machine learning module 154 can also be trained to objectively distinguish a test gemstone 150 from a gemstone holder or other gemstones. The gemstone holder can be the holder 102 in FIG. 1A, or can be one or more prongs, such as metallic prongs, holding the test gemstone 150 in jewelry, such as a ring. For example, once trained, the machine learning module 154 can objectively detect the test gemstone 150 as opposed to a gemstone holder or other gemstones. Exemplary systems and methods for capturing and analyzing images for single or bulk processing of gemstone or jewelry items using machine vision and other techniques are shown and described in co-pending and commonly assigned U.S. Patent No. U.S. Pat. No. 11,222,420, titled "SYSTEM AND METHOD FOR PROCESSING MULTIPLE LOOSE GEMSTONES USING IMAGE-BASED ANALYSIS TECHNIQUES," issued on Jan. 11, 2022, and U.S. Patent No. U.S. Pat. No. 11,132,779, titled "JEWELRY ITEM GRADING SYSTEM AND METHOD," issued on Sep. 28, 2021, each of which is hereby incorporated by reference herein in its entirety.

In one embodiment, the image capturing component 120 can control the lens 125 or the light source 160 to direct light to a different gemstone, gemholder, or objects in an image at different angles to capture a plurality of training images having various parameters, such as the scintillation, the color, the pattern, various patterns of various objects formed by returned light and captured by the imaging system, the dimensions, the physical characteristics, the symmetry, the cut grade, the clarity, the light return, the finishing, the treatment, the facets, the edges, the caratage, etc. of the gemstone, as well as other physical and light responsive attributes of various objects in the images. The lens 125 or the light source 160 can be motorized, for example, with servomotors. Such motorization can be controlled using the processing unit 124. Alternatively, the gemstone holder 102 can be configured to move different gemstones by translation or by rotation, allowing the image capturing component 120 to capture a plurality of training images having the various parameters. In one embodiment, the holder 102 can be motorized, for example, with servomotors under the control of the processing unit 124. In another embodiment, the gemstones can be held or manipulated manually to create the training images. In further embodiments, the data sets of training images can be obtained from a telephone of a user, such as a smartphone, or from a computer connected to a network, or other data gathering devices.

Each training image associated with identifying information representing the various parameters of each different gemstone at each different angle. The identifying information can be a numerical value representing the various parameters of each different gemstone, each gemstone holder, and each type of gemstone holder, at each different angle. Such gemstone holder parameters can indicate a single prong, a set of prongs, a single holder, or a set of holders. The set of holders can specify an individual holder or a batch of gemstone holders. The batch of gemstone holders can be identified by a bounding box or an edge drawing. A union over an intersection of auras or a depiction of differences of multiple different auras or light returned as halos, formations, and patterns can be identified and distinguished. Different objects have different types of light return, halos, and patterns, which are recognized and marked in the training dataset. For example, a holder 102 can be assigned a numerical value of "0", the gemstone 150 can be assigned a numeral value of "1", and at least a second gemstone can be assigned a numerical value of "2". Other numerical values such as "3". "4", etc. can be assigned to other elements associated with gemstones, such as prongs or metal components for mounting a gemstone.

Once the machine learning module 154 is trained to evaluate the various parameters and light responses of different gemstones at different angles, the system 100 can be activated to illuminate the test gemstone 150 or the holder 102, as shown in FIG. 1A, or at least a second gemstone. The image capturing component 120 captures a query image of the test gemstone 150, the holder 102, or at least a second gemstone. One or more test gemstones, gemholders, and test objects can be captured in the query image. The trained machine learning module 154 then processes the query image to obtain and output a value which objectively measures the presence or absence of the gemstone 150, prongs, the holder 102, or the at least a second gemstone, and generate an output value. Alternatively, the trained machine learning module 154 can objectively measure the lack of any gemstone, prongs, or gemstone holder. For example, the output value can be a single number as described above.

Security Analysis of Gemstones

The system 100 with the trained machine learning module 154 can objectively measure various parameters of the test gemstone 150, as described above, including but not limited to the scintillation, the color, the pattern, the dimensions, the symmetry, the cut grade, the clarity, the light return, the finishing, the treatment, the facets, the edges, the caratage, the imaging parameters, and whether the test gemstone 150 is a natural gemstone or a fabricated gemstone. The various parameters of the test gemstone 150 are uniquely associated with the gemstone 150 and with the images of the gemstone 150. Accordingly, the various parameters, light responses, patterns, halos, and other formations can be captured and analyzed by the system 100 which can act as a fingerprint to uniquely identify one gemstone from another. Security analysis of a test gemstone 150 can thus be performed based on images of the gemstone 150 processed by the system 100. Alternatively, such images can be received and processed by other systems as well, external to the system 100. The external system can include an external database, or a telephone, smartphone, or image capturing device of a user configured to receive and analyze the images. Furthermore, the system 100 can maintain a database of images, or can receive images from an external database. Alternatively, a block chain of such images can be maintained for securely storing such images and objectively measured parameters to securely identify a test gemstone 150 in the future. Using such images saved in a database or a block chain, the system 100 or an external system can verify one or more images with test images received against the database or block chain of images.

A block chain is distributed ledger which consists of a growing lists of records, called blocks, that are securely linked together using cryptography. Such a block chain of gemstone images and associated objectively measured parameters of a given gemstone can be stored in the memory 122 or in external storage 116, as shown in FIG. 1B. A computing device, such as a smartphone, a tablet, or a personal computer, can have the capability to access the block chain over the network 114. The computing device can be part of the external gemstone evaluation platform 118. Accordingly, a gemstone evaluator, for example, using such a computing device, can authenticate a given gemstone by accessing the secure block chain trail due to the unique and objectively measured parameters evaluated by the trained machine learning module 154.

Any of the determinations such as subjective or objective results concerning a gemstone can be transmitted, checked, or verified using an app on a smartphone, or by a computer connected to a network, or by other known information conveying devices and systems. Such results can be accessed by any other user to verify, identify, match, measure, value, sell, or grade the gemstones which have been evaluated, or to perform any other alternative task. The results can be accessed over the Internet, over other networks, or over other platforms providing information exchanges.

As can be appreciated the foregoing embodiments provide a solution for, inter alia, the objective classification and quantification of the 4Cs of gemstone grading and a gemstones beauty and other natural features and qualities using an optical response in a gemstone image captured under various lighting, imaging systems and methods. Other disclosed methodologies include an advanced gemstone counting, gemstone identification, gemstone security analysis, and techniques to distinguish between natural, lab grown, synthetic, simulant or treated gemstones.

It is to be noted that, although the foregoing description has been directed to a gemstone imaging device and methods for gemstone analysis using same, the systems and methods disclosed herein can be similarly deployed or implemented in scenarios, situations, and settings far beyond the referenced scenarios. It is to be understood that like numerals in the drawings represent like elements through the several figures, and that not all components and/or steps described and illustrated with reference to the figures are required for all embodiments or arrangements.

Thus, illustrative embodiments and arrangements of the present systems and methods provide a system, processes and computer implemented control methods, computer system, and computer program product for gemstone processing. In alternative embodiments, the present systems and methods can be applied to process non-gemstone objects, or to combinations or gemstones and non-gemstone objects. The flowchart and block diagrams in the figures illustrate the architecture, functionality, and operation of possible implementations of systems, methods and computer program products according to various embodiments and arrangements. In this regard, each block in a flowchart or block diagrams as it relates to a computer implemented method can represent a module, segment, or portion of code, which comprises one or more executable instructions for implementing the specified logical function(s).

It should also be noted that, in some alternative implementations, the functions described herein or noted in a block diagram may occur out of the order noted. For example, two blocks or operations shown or described in succession may, in fact, be executed substantially concurrently, or may sometimes be executed in the reverse order, depending upon the functionality involved. It will also be noted that functional blocks or operations can, where applicable, be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A method for evaluating a gemstone from a gemstone image depicting the gemstone and a visual light response from the gemstone, comprising:

receiving, with a processor of a computing device having a non-transitory computer-readable storage medium and the processor configured by executing a software program stored in the storage medium, training image sets for a plurality of training gemstones, wherein each training image set is captured from a respective training gemstone using an image capturing device, each training image set comprising a plurality of ground truths and a plurality of gemstone images of a respective training gemstone captured at different focal settings of the image capturing device, the plurality of gemstone images captured at different focal settings including at least one in-focus image, at least one underfocused image, and at least one overfocused image, wherein each gemstone image depicts the respective training gemstone and a respective combination of light features caused by the visual light responses of the training gemstone and respective focal setting of the image capturing device;

training, with the processor, a machine learning algorithm using the received training image sets, the machine learning algorithm being trained to detect from the plurality of gemstone images and the respective combination of light features depicted therein, at least one gemstone feature selected from the group consisting of: an inclusion of the gemstone, a particle on the gemstone, a polishing mark of the gemstone, a scratch on the gemstone, an internal pattern of the gemstone, a color of an inclusion of the gemstone, a clarity of the gemstone, a scintillation of the gemstone, a brilliance of the gemstone, a sparkle of the gemstone, a fire of the gemstone, a color of the gemstone, a cut of the gemstone, a symmetry of the gemstone, a polish of the gemstone, a faceting of the gemstone, an edge of the gemstone, a halo of the gemstone, a pattern of the gemstone, a color variation of the gemstone, a visual light performance of the gemstone, wherein the light features include light patterns formed by the gemstone, a pattern associated with faceting or internal structure of the gemstone, a pattern associated with the shape of the gemstone, a pattern associated with a natural characteristic or a manmade characteristic of the gemstone, a pattern associated with a girdle of the gemstone, a color of flashes emanating from the gemstone, and a color of a sparkle emanating from the gemstone;

receiving, at the processor, a query image set comprising at least one query image of the gemstone;

analyzing the query image set using the trained machine learning algorithm to detect from the at least one query image and the light features contained therein, the at least one gemstone feature depicted within the at least one query image;

identifying, by the trained machine learning algorithm, one or more of the at least one gemstone feature in the query image set comprising the at least one query image; and outputting a notification of the identified at least one gemstone feature.

2. The method of claim 1, further comprising:

capturing, with the processor using the image capturing device with associated light conditions, focal settings, and lens settings, the query image set comprising the at least one query image.

3. The method of claim 1, wherein the at least one gemstone feature includes a shape of the gemstone.

4. The method of claim 1, further comprising:

providing, to the machine learning algorithm for each of the training image sets, ground truth information identifying one or more of the at least one gemstone feature, at least one visual light representation of the gemstone feature, and at least one gemstone visual light response feature of the respective gemstone corresponding to each training image.

5. The method of claim 4, wherein the ground truth information further comprises at least one of a respective focal setting, a respective lighting condition, a respective color, a respective exposure setting, or an image capture device setting corresponding to each training image.

6. The method of claim 4, wherein the ground truth information for a respective gemstone corresponding to a given training image includes:

a description of a high-level feature of the respective gemstone, the high-level feature selected from the group consisting of: a clarity, a scintillation, a color, a brilliance, a fire, a sparkle, a shape, and a cut, and a corresponding visual light response of the high-level feature;
a location within the given training image, and a classification of, one or more of the following features of the respective gemstone:
a particle on the respective gemstone, a polishing mark of the respective gemstone, a scratch of the respective gemstone, an internal pattern of the respective gemstone, a color of an inclusion of the respective gemstone, an inclusion of the respective gemstone, a faceting of the respective gemstone, an edge of the respective gemstone, a shape of the respective gemstone, and a color variation of the respective gemstone;
a visual representation of the light responses of the features of the respective gemstone; and
at least one of a location, an image, a color, a color value, and an intensity of one or more features, reflections, or patterns depicted within the given training image caused by light reflected, refracted, diffracted or transmitted by the respective gemstone.

7. The method of claim 1, wherein the machine learning algorithm is selected from the group consisting of: a convolutional neural network, a deep neural network, an artificial immune system (AIS), a you-only-look-once (YOLO) module, a neural Turing machine (NTM), a differential neural computer (DNC), a support vector machine (SVM), a deep learning neural network (DLNN), a naive Bayes module, a decision tree module, a logistic model tree induction (LMT) module, an NBTree classifier, a case-based module, a linear regression module, a Q-learning module, a temporal difference (TD) module, a deep adversarial network, a fuzzy logic module, a K-nearest neighbor module, a clustering module, a random forest module, and a rough set module.

8. The method of claim 2, further comprising:
illuminating the query gemstone using a light source selected from the group consisting of: an incandescent lamp, a light emitting diode, a laser, a tubelight, and sunlight,
wherein the light source emits at least one predetermined frequency.

9. The method of claim 1,
wherein the query image set comprises a plurality of query images captured at different focal settings, and
wherein the step of identifying one or more of the at least one gemstone feature is performed using the query image set.

10. The method of claim 1, wherein a given training image set comprises images captured with different lighting conditions.

11. A system for evaluating a gemstone from a gemstone image or from an image of a visual light response from the gemstone, comprising:
an image capturing device having a plurality of different focal settings, configured to capture the gemstone image of the gemstone, and configured to capture training image sets for a plurality of training gemstones, wherein each training image set is captured from a respective training gemstone using the image capturing device, and each training image set comprises a plurality of ground truths and a plurality of images of the respective training gemstone captured at different focal settings of the image capturing device and captured with different light features shown in each gemstone image or training images of visual light responses of the training gemstone, wherein a given training image set comprises images of gemstones and images of the visual light responses captured at different focal settings includes at least one in-focus image, at least one underfocused image, and at least one overfocused image and captured at different image capturing device settings including an exposure setting; and
a gemstone evaluation device, including:
a processing unit operatively connected to the image capturing device and configured to receive the training image sets, the processing unit comprising a machine learning algorithm,
wherein the machine learning algorithm is trained based on the received training image sets for a plurality of training gemstones, and wherein the machine learning algorithm is trained to detect from the images, the light features contained therein, the visual light responses, and the gemstone characteristics, the at least one gemstone feature depicted within a query image, wherein the at least one gemstone feature is selected from the group consisting of: an inclusion of the gemstone, a particle on the gemstone, a polishing mark of the gemstone, a scratch on the gemstone, an internal pattern of the gemstone, a color of an inclusion of the gemstone, a clarity of the gemstone, a scintillation of the gemstone, a brilliance of the gemstone, a sparkle of the gemstone, a fire of the gemstone, a color of the gemstone, a cut of the gemstone, a symmetry of the gemstone, a polish of the gemstone, a faceting of the gemstone, an edge of the gemstone, a halo of the gemstone, a pattern of the gemstone, a color variation of the gemstone, a visual light performance of the gemstone, light patterns formed by the gemstone, a pattern associated with faceting or internal structure of the gemstone, a pattern associated with the shape of the gemstone, a pattern associated with a natural characteristic or a manmade characteristic of the gemstone, a pattern associated with a girdle of the gemstone, a color of flashes emanating from the gemstone, and a color of a sparkle emanating from the gemstone, and
wherein the processing unit is configured to:
receive a query image set comprising at least one query image of the gemstone from the image capturing device with associated light conditions, focal settings, and lens settings, and
analyze the query image set using the trained machine learning algorithm, wherein the trained machine learning algorithm is configured to identify, based on the query image, one or more of the at least one gemstone feature in the query image set comprising the at least one query image; and
an output device configured to output a notification of the identified at least one gemstone feature.

12. The system of claim 11, wherein the machine learning algorithm is trained according to the training image sets and, for each of the training image sets, ground truth information identifying one or more of the at least one gemstone feature, at least one visual light representation of the gemstone feature, and at least one gemstone visual light response feature of the respective gemstone corresponding to each training image.

13. The system of claim 12, wherein the ground truth information further comprises at least one of a respective focal setting, a respective lighting condition, a respective color, a respective exposure setting, or an image capture device setting corresponding to each training image.

14. The system of claim 12, wherein the ground truth information for a respective gemstone corresponding to a given training image includes:
- a description of a high-level feature of the respective gemstone, the high-level feature selected from the group consisting of: a clarity, a scintillation, a color, and a cut, and a corresponding visual light response of the high-level feature;
- a location within the given training image, and a classification of, one or more of the following features of the respective gemstone:
- a particle on the gemstone, a polishing mark of the gemstone, a scratch of the gemstone, an internal pattern of the gemstone, a color of an inclusion of the gemstone, an inclusion of the gemstone, a faceting of the gemstone, an edge of the gemstone, a shape of the gemstone, and a color variation of the gemstone;
- a visual representation of the light responses of the features of the respective gemstone; and
- at least one of a location, an image, a color, a color value, and an intensity of one or more features, reflections, or patterns depicted within the given training image caused by light reflected, refracted, diffracted or transmitted by the gemstone.

15. The system of claim 11, further comprising:
- a light source configured to illuminate the gemstone, the light source selected from the group consisting of: an incandescent lamp, a light emitting diode, a laser, a tubelight, and sunlight, wherein the light source emits at least one predetermined frequency.

16. The system of claim 11,
wherein the at least one gemstone feature includes a shape of the gemstone.

17. The system of claim 11, wherein the machine learning algorithm is selected from the group consisting of: a convolutional neural network, a deep neural network, an artificial immune system (AIS), a you-only-look-once (YOLO) module, a neural Turing machine (NTM), a differential neural computer (DNC), a support vector machine (SVM), a deep learning neural network (DLNN), a naive Bayes module, a decision tree module, a logistic model tree induction (LMT) module, an NBTree classifier, a case-based module, a linear regression module, a Q-learning module, a temporal difference (TD) module, a deep adversarial network, a fuzzy logic module, a K-nearest neighbor module, a clustering module, a random forest module, and a rough set module.

18. The system of claim 11,
wherein the query image set comprises a plurality of query images captured at different focal settings, and
wherein the step of identifying one or more of the at least one gemstone feature is performed using the query image set.

19. The system of claim 11, wherein a given training image set comprises images captured with different lighting conditions or different focal conditions.

* * * * *